(12) United States Patent
Garnier et al.

(10) Patent No.: US 12,305,085 B2
(45) Date of Patent: May 20, 2025

(54) COMPOSITIONS WHICH ARE CROSS-LINKABLE BY HEATING, AND CORRESPONDING SELF-ADHESIVE ARTICLES

(71) Applicant: BOSTIK SA, Colombes (FR)

(72) Inventors: Claire Garnier, Venette (FR); Olivier Laferte, Venette (FR)

(73) Assignee: BOSTIK SA, Colombes (FR)

( * ) Notice: Subject to any disclaimer, the term of this patent is extended or adjusted under 35 U.S.C. 154(b) by 719 days.

(21) Appl. No.: 17/415,795

(22) PCT Filed: Dec. 4, 2019

(86) PCT No.: PCT/FR2019/052917
§ 371 (c)(1),
(2) Date: Jun. 18, 2021

(87) PCT Pub. No.: WO2020/128200
PCT Pub. Date: Jun. 25, 2020

(65) Prior Publication Data
US 2022/0049143 A1   Feb. 17, 2022

(30) Foreign Application Priority Data
Dec. 20, 2018 (FR) ..................... 1873630

(51) Int. Cl.
| | | |
|---|---|---|
| C09J 7/29 | (2018.01) | |
| C08K 3/34 | (2006.01) | |
| C09J 7/35 | (2018.01) | |
| C09J 183/08 | (2006.01) | |

(52) U.S. Cl.
CPC ............... *C09J 183/08* (2013.01); *C08K 3/34* (2013.01); *C09J 7/29* (2018.01); *C09J 7/35* (2018.01); *C09J 2203/334* (2013.01)

(58) Field of Classification Search
CPC ..... C09J 183/08; C09J 7/29; C09J 7/35; C09J 2203/334; C09J 7/38; C09J 171/00; C09J 175/04; C09J 201/10; C09J 171/02; C08K 3/34; C08K 5/549; C08K 5/01; C08G 18/289; C08G 18/42; C08G 18/4238; C08G 18/4277; C08G 18/44; C08G 18/48; C08G 18/69; C08G 18/73; C08G 18/755; C08G 18/7621; C08G 2170/40; C08G 2471/00; C08G 18/4825; C08G 18/4829; C08G 18/61; C08G 18/622; C08G 18/718; C08G 18/758; C08G 18/7642; C08G 18/7671; C08G 65/336; C08L 101/10; C08L 83/04
See application file for complete search history.

(56) References Cited

U.S. PATENT DOCUMENTS

| | | | |
|---|---|---|---|
| 2011/0151253 A1* | 6/2011 | Laferte | ................ C08G 18/718 524/502 |
| 2017/0088756 A1* | 3/2017 | Chatterjee | .............. C09J 133/08 |
| 2020/0095377 A1* | 3/2020 | Sanz | ..................... C08K 5/549 |

FOREIGN PATENT DOCUMENTS

| | | | | |
|---|---|---|---|---|
| EP | 2336208 A1 * | 6/2011 | ......... | C08G 18/4825 |
| JP | 2013107354 A * | 6/2013 | | |
| WO | 2009106699 A2 | 9/2009 | | |
| WO | 2018215463 A1 | 11/2018 | | |

OTHER PUBLICATIONS

Data sheet for Primol 352. Exxon. (Year: 2024).*
Data Sheet for Irganox 1076 from BASF. Jul. 2019. (Year: 2019).*

* cited by examiner

*Primary Examiner* — K. Boyle
(74) *Attorney, Agent, or Firm* — NK Patent Law

(57) ABSTRACT

1) A heat-crosslinkable adhesive composition, comprising:
   at least one polymer (A) comprising a hydrolyzable alkoxysilane group;
   at least one tackifying resin (B);
   at least one silsesquioxane resin (C); and
   at least one crosslinking catalyst (D).
2) A self-adhesive article comprising a support layer coated with a self-adhesive layer consisting of the adhesive composition in the crosslinked state.

10 Claims, No Drawings

COMPOSITIONS WHICH ARE CROSS-LINKABLE BY HEATING, AND CORRESPONDING SELF-ADHESIVE ARTICLES

CROSS-REFERENCE TO RELATED APPLICATIONS

This application is a U.S. National Stage application of International Patent Application No. PCT/FR2019/052917, filed on Dec. 4, 2019, which claims the benefit of French Patent Application No. 1873630, filed on Dec. 20, 2018.

The present invention relates to a novel heat-crosslinkable adhesive composition based on a polymer comprising at least one hydrolyzable alkoxysilane group. The invention also relates to a self-adhesive article, notably a self-adhesive support which comprises a support layer coated with a self-adhesive layer consisting of said composition in the crosslinked state. Finally, the invention relates to a process for manufacturing said article.

Pressure-sensitive adhesives (PSAs) are substances which give an initial grab at ambient temperature to the support layer on which they are coated. This initial grab, often denoted by the term "tack", enables the instantaneous adhesion of said self-adhesive support to all types of substrates, under the effect of a gentle and brief pressure. Due to its adhesive power, usually evaluated by a peel test, said self-adhesive support is then firmly attached to said substrate by means of an adhesive seal.

PSAs are widely used in the manufacture of self-adhesive articles, for instance self-adhesive labels which are attached to articles for purposes of presentation of information (such as a barcode, name or price) and/or for decorative purposes, whether during permanent or temporary adhesive bonding operations.

PSAs are also employed in the manufacture of self-adhesive tapes of varied uses. Mention may be made, for example, besides the transparent adhesive tape widely used in daily life, of: the forming and the assembling of cardboard packagings; the protection of surfaces for painting operations, in construction; the fixing and the maintenance of various elements, such as panels, bricks, protruding objects, in the construction of buildings or edifices; the fixing and the maintenance of metal, plastic or glass parts, which are flat or which have specific profiles, such as electric cables, plastic films, window panes, metal sheets, inscriptions, logos, parts of seats, dashboards, plastic or textile walls, conduits or pipes for the circulation of fluids, notably in the transportation industry; the adhesive bonding of fitted carpets by double-sided adhesive tapes in the building sector.

For the purpose of manufacturing self-adhesive articles (for example self-adhesive labels and/or tapes), PSAs are generally applied by continuous coating processes over the whole of the surface of a large-sized support layer (if appropriate printable), in an amount (generally expressed in $g/m^2$) denoted below by the term of "weight per unit area". The support layer is, for example, paper or a film consisting of a polymeric material having one or more layers. The layer of self-adhesive composition which covers the support layer can itself be covered with a protective nonstick layer (often known as a release liner), for example consisting of a silicone film. The multilayer system obtained is generally packaged by winding in the form of large reels having a width of up to 2 m and having a diameter of 1 m, which can be stored and transported.

These multilayer systems can subsequently be converted into self-adhesive labels which can be applied by the final user, by means of transformation processes which include the printing of desired informative and/or decorative elements onto the printable face of the support layer, followed by cutting to the desired shape and sizes. The protective nonstick layer can be easily removed without modifying the adhesive layer, which remains attached to the support layer. After separation from its nonstick protective layer, the label is applied to the article to be coated either manually or with the aid of labelling machines on automated packaging lines.

These multilayer systems may also be converted into self-adhesive tapes by cutting and packaging as rolls of given widths and lengths with cutting or pre-cutting of particular shapes that are useful for their final use, for instance for the assembly of parts of variable size and of variable shape, in the electronics industry, whether for industrial applications or for consumer purposes.

Patent applications WO 09/106699 and EP 2336208 already notably disclose heat-crosslinkable adhesive compositions, based on polyurethane (or polyether) bearing hydrolyzable alkoxysilane end groups, which, when coated onto a support and heated, lead, on conclusion of a chemical crosslinking reaction performed in the presence of moisture, to the production of a self-adhesive support which has the required adhesive power (or peel) and tack properties. This crosslinking reaction leads to the formation of an adhesive seal which has a three-dimensional polymer network structure comprising siloxane bonds and which ensures the fixing of the self-adhesive support to the substrate. Said self-adhesive support may thus be used for the manufacture of self-adhesive labels and/or tapes.

On account of the large number of current or potential uses of self-adhesive articles, notably self-adhesive labels and tapes, it is, however, desirable to improve the properties of the self-adhesive supports disclosed by the two above-mentioned patent applications, and notably their adhesive power and their tack.

Improving these properties is also keenly anticipated in the field of self-adhesive tapes with a high weight per unit area which are liable to be used in the construction sector, for example for the bonding of double or triple glazing in an aluminum window frame. Specifically, for such an application, it is important for the adhesive seal, which ensures the assembly of the rigid panel consisting of the double or triple glazing with the window frame, to have improved elastomeric properties, notably in terms of elongation at break and tensile strength, so as to conserve all its efficiency in the face of the mechanical stresses and temperature variations observed during the lifetime of the window.

It is thus also desirable to have available self-adhesive articles, and notably self-adhesive supports, which are able to be obtained by crosslinking adhesive compositions based on a polymer containing a hydrolyzable alkoxysilane group, and for which the elongation at break and the tensile strength are increased.

Moreover, the crosslinking time required to obtain a self-adhesive support having advantageous adhesive power and tack properties is a particularly important parameter as regards the industrial production of said self-adhesive supports. This is because it determines the size scale of the oven required for the heating, and also the corresponding residence time of the coated support layer, or the energy consumption, and thus the production efficiency of the process as a whole. It is thus also desirable to reduce said crosslinking time so as to increase the production efficiency of said process.

The aim of the present invention is thus to propose a self-adhesive article, notably a self-adhesive support, which has improved adhesive power and/or tack on various substrates.

Another aim of the present invention is to propose a self-adhesive article, notably a self-adhesive support, such that the elongation at break and the tensile strength of the adhesive seal formed after fixing said article to the support are increased.

Another aim of the present invention is to meet the preceding aims for a self-adhesive article, notably a self-adhesive support, with a high weight per unit area, typically greater than 100 g/m², preferably greater than 450 g/m².

Another aim of the present invention is to meet the preceding aims while at the same time reducing the cross-linking time required for the industrial production of said self-adhesive support.

It has now been found that these aims can be achieved, totally or partly, by means of the adhesive composition and of the self-adhesive article which are described hereinbelow.

A subject of the present invention is thus, firstly, a heat-crosslinkable adhesive composition, characterized in that it comprises:
- at least one polymer (A) comprising a hydrolyzable alkoxysilane group;
- at least one tackifying resin (B);
- at least one silsesquioxane resin (C); and
- at least one crosslinking catalyst (D).

Polymer (A):

For the purposes of the present invention, the term "polymer (A) comprising a hydrolyzable alkoxysilane group" means a polymer which comprises at least one, and preferably at least two, hydrolyzable groups of formula (I):

$$-\text{Si}(R^4)_p(OR^5)_{3-p} \quad (I)$$

in which:
- $R^4$ represents a linear or branched alkyl radical comprising from 1 to 4 carbon atoms, with the possibility that when there are several radicals $R^4$, these radicals are identical or different;
- $R^5$ represents a linear or branched alkyl radical comprising from 1 to 4 carbon atoms, with the possibility that when there are several radicals $R^5$, these radicals are identical or different, with the possibility that two groups $OR^5$ may be engaged in the same ring; and
- p is an integer equal to 0, 1 or 2, preferably equal to 0 or 1.

The hydrolyzable alkoxysilane group is preferably in the terminal position of said polymer. A position in the middle of the chain is, however, not excluded. The polymer (A) is not crosslinked before the application of the adhesive composition. The adhesive composition is applied under conditions that enable the crosslinking thereof.

The polymer (A) is thus a silyl polymer which is generally in the form of a more or less viscous liquid. Preferably, the polymer (A) has a viscosity ranging from 10 to 200 Pa·s, preferably ranging from 20 to 175 Pa·s, said viscosity being measured, for example, according to a Brookfield-type method at 23° C. and 50% relative humidity (S28 needle). More generally, the viscosities that are indicated in the present text are, unless otherwise indicated, Brookfield viscosities.

The polymer (A) preferably comprises two groups of formula (I), but it may also comprise from three to six groups of formula (I).

Preferably, the polymer(s) (A) have an average molar mass ranging from 500 to 50 000 g/mol, more preferably ranging from 700 to 20 000 g/mol. The molar mass of the polymers and of the various ingredients of the adhesive composition according to the invention may be measured by methods well known to a person skilled in the art, for example by NMR and size exclusion chromatography using polystyrene standards.

According to one embodiment of the invention, the polymer (A) corresponds to one of the formulae (II), (III) or (IV):

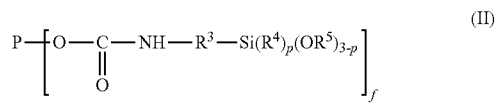

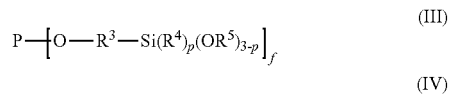

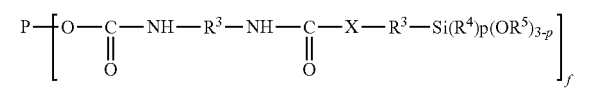

in which:
- $R^4$, $R^5$ and p have the same meaning as in formula (I) described above,
- P represents a saturated or unsaturated, linear or branched polymeric radical optionally comprising one or more heteroatoms, such as oxygen, nitrogen, sulfur or silicon, and preferably having a number-average molar mass ranging from 100 g/mol to 48 600 g/mol, more particularly from 300 g/mol to 18 600 g/mol or from 500 g/mol to 12 600 g/mol,
- $R^1$ represents a divalent hydrocarbon-based radical comprising from 5 to 15 carbon atoms, which may be aromatic or aliphatic, linear, branched or cyclic,
- $R^3$ represents a linear or branched divalent alkylene radical comprising from 1 to 6 carbon atoms, preferably from 1 to 3 carbon atoms,
- X represents a divalent radical chosen from —NH—, —NR⁷— or —S—,
- $R^7$ represents a linear or branched alkyl radical comprising from 1 to 20 carbon atoms and which may also comprise one or more heteroatoms, and
- f is an integer ranging from 1 to 6, preferably ranging from 2 to 5, preferably from 2 to 4, more preferably from 2 to 3.

Preferably, in formulae (II), (III) and/or (IV) above, P represents a polymer radical chosen, in a nonlimiting manner, from polyethers, polycarbonates, polyesters, polyolefins, polyacrylates, polyether polyurethanes, polyester polyurethanes, polyolefin polyurethanes, polyacrylate polyurethanes, polycarbonate polyurethanes, and block polyether/polyester polyurethanes.

For example, EP 2468783 describes silyl polymers of formula (II) in which P represents a polymeric radical containing polyurethane/polyester/polyether blocks.

According to one embodiment, the silyl polymers are chosen from silyl polyurethanes, silyl polyethers, and mixtures thereof.

According to a particular embodiment, the silyl polymer (A) corresponds to one of the formulae (II'), (III') or (IV'):

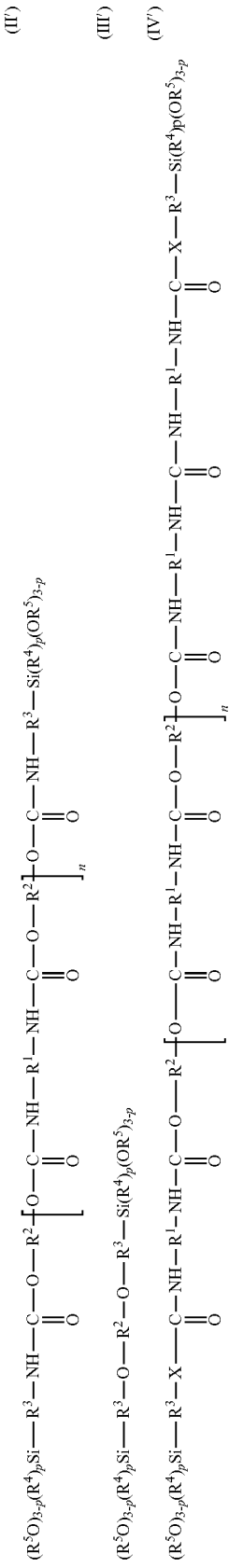

in which:
- $R^1$, $R^3$, $R^4$, $R^5$, X, $R^7$ and p have the same meaning as in formulae (II), (III) and (IV) described above,
- $R^2$ represents a saturated or unsaturated, linear or branched divalent hydrocarbon-based radical optionally comprising one or more heteroatoms, such as oxygen, nitrogen, sulfur or silicon, and preferably having a number-average molar mass ranging from 100 g/mol to 48 600 g/mol, more particularly from 300 g/mol to 18 600 g/mol or from 500 g/mol to 12 600 g/mol, and
- n is an integer greater than or equal to 0.

In the silyl polymers of formulae (II'), (III') or (IV') defined above, when the radical $R^2$ comprises one or more heteroatoms, said heteroatom(s) are not present at the end of the chain. In other words, the free valencies of the divalent radical $R^2$ bonded to the oxygen atoms neighboring the silyl polymer each originate from a carbon atom. Thus, the main chain of the radical $R^2$ is terminated with a carbon atom at each of the two ends, said carbon atom then having a free valency.

According to one embodiment, the silyl polymers (A) are obtained from polyols chosen from polyether polyols, polyester polyols, polycarbonate polyols, polyacrylate polyols, polysiloxane polyols and polyolefin polyols, and mixtures thereof, and more preferably from diols chosen from polyether diols, polyester diols, polycarbonate diols, polyacrylate diols, polysiloxane diols, polyolefin diols, and mixtures thereof. In the case of the polymers of formula (II'), (III') or (IV') described above, such diols may be represented by the formula HO—$R^2$—OH where $R^2$ has the same meaning as in formula (II'), (III') or (IV').

For example, among the radicals of the type $R^2$ which may be present in formula (II'), (III') or (IV'), mention may be made of the following divalent radicals, of which the formulae below show the two free valencies:

derivative of a polypropylene glycol:

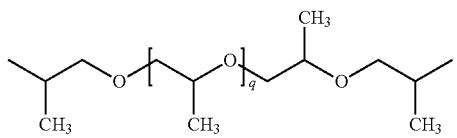

derivative of a polyester diol:

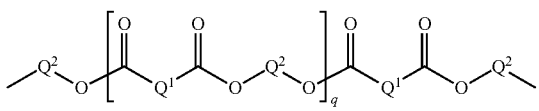

derivative of a polybutadiene diol:

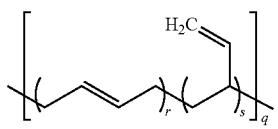

derivative of a polyacrylate diol:

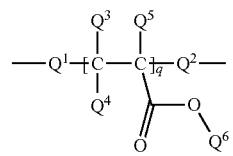

derivative of a polysiloxane diol:

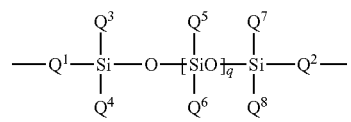

In the above formulae, the radicals and indices have the following meanings:
- q represents an integer such that the number-average molecular mass of the radical $R^2$ ranges from 100 g/mol to 48 600 g/mol, preferably from 300 g/mol to 18 600 g/mol, more preferably from 500 g/mol to 12 600 g/mol,
- r and s represent zero or a non-zero integer such that the number-average molecular mass of the radical $R^2$ ranges from 100 g/mol to 48 600 g/mol, preferably from 300 g/mol to 18 600 g/mol, more preferably from 500 g/mol to 12 600 g/mol, it being understood that the sum r+s is other than zero,
- $Q^1$ represents a linear or branched, saturated or unsaturated aromatic or aliphatic divalent alkylene radical preferably containing from 1 to 18 carbon atoms, more preferably from 1 to 8 carbon atoms,
- $Q^2$ represents a linear or branched divalent alkylene radical preferably containing from 2 to 36 carbon atoms, more preferably from 1 to 8 carbon atoms,
- $Q^3$, $Q^4$, $Q^5$, $Q^6$, $Q^7$ and $Q^8$ represent, independently of each other, a hydrogen atom or an alkyl, alkenyl or aromatic radical preferably containing from 1 to 12 carbon atoms, preferably from 2 to 12 carbon atoms, more preferably from 2 to 8 carbon atoms.

According to one embodiment of the composition according to the invention, the silyl polymer (A) is such that the radical $R^2$ which appears in formulae (II'), (III') and (IV') represents a polyether radical, preferably a poly(oxyalkylene) radical, and even more preferably a radical derived from a polypropylene glycol corresponding to the formula indicated above.

According to one embodiment, $R^1$ is chosen from one of the following divalent radicals, of which the formulae below reveal the two free valencies:

a) the divalent radical derived from isophorone diisocyanate (IPDI):

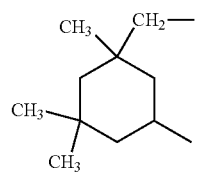

b) the divalent radical derived from dicyclohexylmethane diisocyanate (H12MDI)

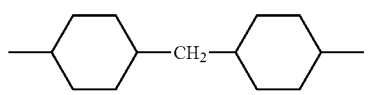

c) the divalent radical derived from toluene diisocyanate (TDI)

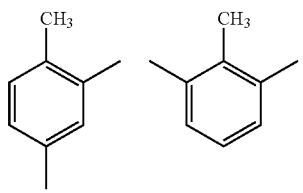

d) the divalent radicals derived from the 4,4' and 2,4' isomers of diphenylmethane diisocyanate (MDI)

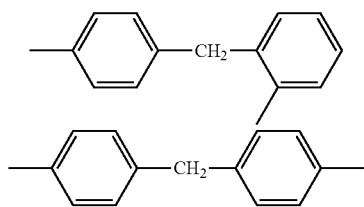

e) the divalent radical derived from hexamethylene diisocyanate (HDI) —$(CH_2)_6$— f) the divalent radical derived from m-xylylene diisocyanate (m-XDI).

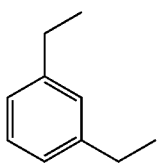

The polymers of formula (II) or (II') may be obtained according to a process described in EP 2336208 and WO 2009/106699. A person skilled in the art will know how to adapt the manufacturing process described in these two documents in the case of the use of different types of polyols. Among the polymers corresponding to formula (II), mention may be made of:

Geniosil® STP-E10 (available from Wacker): polyether comprising two groups (I) of dimethoxy type (n equal to 0, p equal to 1 and $R^4$ and $R^5$ represent a methyl group) having a number-average molar mass of 8889 g/mol where $R^3$ represents a methyl group;

Geniosil® STP-E30 (available from Wacker): with a number-average molar mass of 14 493 g/mol, this is a polypropylene glycol with two end groups consisting of a dimethoxy(methyl)silylmethyl carbamate, i.e. in formula (II'): n is equal to 0; p is equal to 1; $R^4$ and $R^5$ represent a methyl group and $R^3$ represents a methyl group;

Spur+® 1050 MM (available from Momentive): polyurethane comprising two groups (I) of trimethoxy type (n other than 0, p equal to 0 and $R^5$ represents a methyl group) having a number-average molar mass of 16 393 g/mol where $R^3$ represents an n-propyl group;

Spur+® Y-19116 (available from Momentive): polyurethane comprising two groups (I) of trimethoxy type (n other than 0 and $R^5$ represents a methyl group) having a number-average molar mass ranging from 15 000 to 17 000 g/mol g/mol where $R^3$ represents an n-propyl group;

Desmoseal® S XP 2636 (available from Bayer): polyurethane comprising two groups (I) of trimethoxy type (n other than 0, p equal to 0 and $R^5$ represents a methyl group) having a number-average molar mass of 15 038 g/mol where $R^3$ represents an n-propylene group.

The polymers of formula (III) or (III') may be obtained by hydrosilylation of polyether diallyl ether according to a process described, for example, in EP 1 829 928. Among the polymers corresponding to formula (III), mention may be made of:

the polymer MS SAX® 350 (available from Kaneka) corresponding to a polyether comprising two groups (I) of dimethoxy type (p equal to 1 and $R^4$ and $R^5$ represent a methyl group) having a number-average molar mass ranging from 14 000 to 16 000 g/mol;

the polymer MS SAX® 260 (available from Kaneka) corresponding to a polyether comprising two groups (I) of dimethoxy type (p equal to 1 and $R^4$ and $R^5$ represent a methyl group) having a number-average molar mass of 16 000 to 18 000 g/mol where $R^3$ represents an ethyl group;

the polymer MS S303H (available from Kaneka) corresponding to a polyether comprising two groups (I) of dimethoxy type (p is equal to 1 and $R^4$ represents a methyl group) having a number-average molecular mass of about 22 000 daltons.

The polymers of formula (IV) or (IV') may be obtained, for example, by reaction of polyol(s) with one or more diisocyanates followed by a reaction with aminosilanes or mercaptosilanes. A process for preparing polymers of formula (IV) or (IV') is described in EP 2 583 988. A person skilled in the art will know how to adapt the manufacturing process described in said document in the case of using different types of polyols.

According to a preferred embodiment of the invention, the adhesive composition comprises at least one silyl polymer of formula (II) and/or (II') or at least one silyl polymer of formula (III) and/or (III').

According to a most particularly preferred embodiment of the invention, polymer (A) is a silyl polymer of formula (III') in which $R^2$ is a divalent radical derived from a polyether, preferably from a poly(oxyalkylene) diol and even more particularly from a polypropylene glycol.

Tackifying Resin (B):

The heat-crosslinkable adhesive composition according to the invention also comprises at least one tackifying resin (B).

Said resin may be any resin that is compatible with the silyl polymer(s) (A).

The term "compatible tackifying resin" denotes a tackifying resin which, when mixed in 50%/50% proportions with the polymer(s) (A) of formula (I), gives a substantially homogeneous mixture.

The resins (B) are advantageously chosen from:

(i) resins obtained by polymerization of terpene hydrocarbons and of phenols, in the presence of Friedel-Crafts catalysts;

(ii) resins obtained by a process comprising the polymerization of α-methylstyrene, it also being possible for said process to comprise a reaction with phenols;
(iii) rosins of natural origin or modified rosins, for instance the rosin extracted from pine gum, wood rosin extracted from tree roots and derivatives thereof which are hydrogenated, dimerized, polymerized or esterified with monoalcohols or polyols, such as glycerol or pentaerythritol;
(iv) resins obtained by hydrogenation, polymerization or copolymerization (with an aromatic hydrocarbon) of mixtures of unsaturated aliphatic hydrocarbons containing approximately 5, 9 or 10 carbon atoms obtained from petroleum fractions;
(v) terpene resins (generally resulting from the polymerization of terpene hydrocarbons, for instance monoterpene (or pinene), in the presence of Friedel-Crafts catalysts);
(vi) copolymers based on natural terpenes (for instance styrene/terpene, α-methylstyrene/terpene and vinyltoluene/terpene); or
(vii) acrylic resins having a viscosity at 100° C. of less than 100 Pa·s.; and also from mixtures of these resins.

Such resins are commercially available and, among those of types (i), (ii), (iii) and (iv) defined above, mention may be made of the following products:
resins of type (i): Dertophene® 1510, available from the company DRT, having a molar mass Mn of about 870 Da; Dertophene® H150, available from the same company, having a molar mass Mn equal to about 630 Da; Sylvarez® TP 95, available from the company Arizona Chemical, having a molar mass Mn of about 1200 Da;
resins of type (ii): Cleartack® W100, available from the company Cray Valley, which is obtained by polymerization of α-methylstyrene without the action of phenols, with a number-average molar mass of 900 Da; Sylvarez® 510, which is also available from the company Arizona Chemical, with a molar mass Mn of about 1740 Da, the process for the production of which also comprises the addition of phenols;
resins of type (iii): Sylvalite® RE 100, which is an ester of rosin and pentaerythritol available from the company Arizona Chemical and with a molar mass Mn of about 1700 Da;
resins of type (iv): Picco® AR100 available from the company Eastman and with a molar mass Mn of about 550 g/mol.

According to a preferred variant, use is made, as resin (B), of a resin chosen from those of type (i) or (iv).

Silsesquioxane Resin (C):

The heat-crosslinkable adhesive composition according to the invention also comprises at least one silsesquioxane resin (C).

Silsesquioxane resins are organosilicon compounds which can adopt a polyhedral structure or a polymeric structure, with Si—O—Si bonds. They have the following general formula:

[RSiO$_{3/2}$]t in which R, which may be identical or different in nature, represents an organic radical and t is an integer which may range from 6 to 12, t preferably being equal to 6, 8, 10 or 12.

According to one embodiment, the silsesquioxane (C) has a polyhedral structure (or POSS for "Polyhedral Oligomeric Silsesquioxane").

Preferably, the silsesquioxane (C) corresponds to the general formula (V) below:

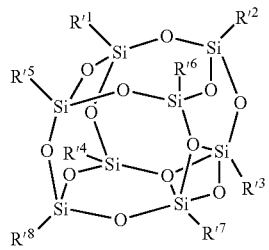

(V)

in which each one from among $R'^1$ to $R'^8$ represents, independently of each other, a group chosen from:
a hydrogen atom,
a radical chosen from the group consisting of a linear or branched C1-C4 alkoxy radical, a linear or branched alkyl radical comprising from 1 to 30 carbon atoms, an alkenyl radical comprising from 2 to 30 carbon atoms, an aromatic radical comprising from 6 to 30 carbon atoms, an allyl radical comprising from 3 to 30 carbon atoms, a cyclic aliphatic radical comprising from 3 to 30 carbon atoms and an acyl radical comprising from 1 to 30 carbon atoms, and
a group —OSiR$'^9$R$'^{10}$ in which R$'^9$ and R$'^{10}$ each represents, independently of each other, a hydrogen atom or a radical chosen from the group consisting of linear or branched C1-C4 alkyls, linear or branched C1-C4 alkoxys, C2-C4 alkenyls, aphenyl, a C3-C6 allyl radical, a cyclic C3-C8 aliphatic radical and a C1-C4 acyl radical;
on condition:
that at least one radical from among the radicals $R'^1$ to $R'^8$ is a C1-C4 alkoxy radical; and
that at least one radical from among the radicals $R'^1$ to $R'^8$ is a phenyl radical.

Silsesquioxanes are known compounds that are notably described in patent application WO 2008/107331. Some are also commercially available, thus the product from Dow sold under the name: Dow Corning® 3074 and Dow Corning® 3037 (CAS number=68957-04-0).

Crosslinking Catalyst (D):

The heat-crosslinkable adhesive composition according to the invention also comprises at least one crosslinking catalyst (D).

Said catalyst may be any catalyst known to a person skilled in the art for the condensation of silanol.

The crosslinking catalyst (D) may be chosen from the group consisting of:
(D1) organometallic compounds,
(D2) amines, and
(D3) acids and derivatives thereof,
and also mixtures thereof.

It may also be a mixture of catalysts belonging to the same group (D1), (D2) or (D3) (for example a mixture of several amines), or a mixture of catalysts belonging to at least two different groups chosen from the groups (D1), (D2) and (D3) (for example a mixture of an amine and of an organometallic compound).

In the context of the invention, the term "organometallic compounds" means compounds comprising an organic radical and at least one metal. In the context of the invention, the term "organic radical" means a radical comprising at least one carbon atom.

(D1) Organometallic Compounds:

The organometallic compounds may comprise organometallic compounds (compounds comprising at least one metal-carbon covalent bond), metal alkoxides, metal carboxylates, and metallic coordination complexes with one or more organic ligands.

Examples of organic ligands that may be mentioned include acetylacetonate and oximes.

The metal atom of the organometallic compounds may be any metal atom known to those skilled in the art, and may be chosen in particular from tin, aluminum, zinc, cobalt, iron, nickel, bismuth, titanium, or zirconium. The organometallic compounds may moreover comprise several metal atoms.

Compounds comprising at least one metal-carbon covalent bond:

The compounds comprising at least one metal-carbon covalent bond (organometallic compounds) may be carboxylates of organometallic compounds chosen from the group consisting of dibutyltin dilaurate (DBTL), dibutyltin diacetate, dibutyltin diethylhexanoate, dioctyltin dineodecanoate (available, for example, under the name TIB KAT® 223 from the company TIB Chemicals), dibutyltin dioleate, dibutyltin benzylmaleate, diphenyltin diacetate, and mixtures thereof.

The metal alkoxides may be chosen from the group consisting of titanium tetrabutoxide, titanium tetraisopropoxide, zirconium tetrabutoxide, zirconium tetraisopropoxide, and mixtures thereof.

The metal carboxylates may be chosen from the group consisting of zinc 2-ethylcaproate, zinc diacetate, zinc dineododecanoate, zinc diundecenoate, zinc dimethacrylate, cobalt acetylacetonate, cobalt diacetate, iron acetylacetonate, iron diacetate, nickel acetylacetonate, nickel diacetate, bismuth acetate, bismuth trioctanoate, bismuth dineodecanoate, zinc bismuth dineodecanoate, and mixtures thereof.

The metal coordination complexes with one or more organic ligands may be chosen from the group consisting of zinc acetylacetonate, titanium acetylacetonate (commercially available, for example, under the name Tyzor® AA75 from the company Dorf Ketal), titanium tetraacetylacetonate, aluminum trisacetylacetonate, aluminum chelates, for instance bis(ethyl acetoacetate) monoacetylacetonate (commercially available, for example, under the name K-KAT® 5218 from the company King Industries), zirconium tetraacetylacetonate, diisopropoxybis(ethylacetonato)titanium, and mixtures thereof.

(D2) Amines:

The amines may be primary amines, secondary amines or tertiary amines.

Preferably, the amines are chosen from the group consisting of triethylamine, tributylamine, tetramethylguanidine, 1,8-diazabicyclo[5.4.0]-7-undecene, 1,4-diazabicyclo[2.2.2]octane, 1,5-diazabicyclo[4.3.0]non-5-ene, N,N-bis (N,N-dimethyl-2-aminoethyl)methylamine, N,N-dimethylcyclohexylamine, N,N-dimethylphenylamine, N-ethylmorpholine, and mixtures thereof.

(D3) Acid Catalysts and Derivatives Thereof:

The acid catalysts may be chosen from inorganic acid catalysts, organic acid catalysts, and mixtures thereof.

Among the inorganic acid catalysts, examples that may be mentioned include phosphoric or orthophosphoric acid, phosphorous acid, hypophosphorous acid, or sulfuric acid.

The organic acid catalysts may be chosen from sulfonic acids, carboxylic acids, organophosphate acids, organophosphonate acids, phosphonic acids, and mixtures thereof.

Preferably, the organic and inorganic acid catalysts have a pKa of less than or equal to 6, preferably less than or equal to 4, advantageously less than or equal to 2, advantageously less than or equal to 0.

The sulfonic acids may be aliphatic or aromatic, optionally substituted (for example substituted with at least one substituent chosen from halogens (such as fluorine), hydroxyls, alkyls, amines, and mixtures thereof), and may be mono- or disulfonic.

The sulfonic acids may be chosen from N-alkylaminoalkylsulfonic acids and N,N-dialkylaminoalkylsulfonic acids (zwitterions), for instance 2-(N-morpholino)ethanesulfonic acid, 3-(N-morpholino)propanesulfonic acid, 4-[N-morpholino]butanesulfonic acid, 1,4-piperazinediethanesulfonic acid, N-2-hydroxyethylpiperazine-N'-2-ethanesulfonic acid, 2-(N-morpholino)ethanesulfonic acid, N-morpholinomethanesulfonic acid, N-(2-hydroxyethyl)piperazine-N'-methanesulfonic acid, piperazine-N,N'-bis(methanesulfonic acid), cyclohexylaminomethanesulfonic acid, N-[tris(hydroxymethyl)methyl]aminomethanesulfonic acid, N,N-bis (2-hydroxyethyl)aminomethanesulfonic acid; para-toluenesulfonic acid; benzenesulfonic acid; methanesulfonic acid; dodecylbenzenesulfonic acid; dodecylbenzenedisulfonic acid; dinonylnaphthalenedisulfonic acid; dinonylnaphthalenesulfonic acid; trifluoromethylsulfonic acid; and mixtures thereof.

In particular, the sulfonic acids are chosen from para-toluenesulfonic acid, benzenesulfonic acid, methanesulfonic acid, dodecylbenzenesulfonic acid, dodecylbenzenedisulfonic acid, dinonylnaphthalenedisulfonic acid, dinonylnaphthalenesulfonic acid, trifluoromethylsulfonic acid, and mixtures thereof.

Among the carboxylic acid catalysts, examples that may be mentioned include malonic acid, succinic acid, maleic acid, oxalic acid, acetic acid, lactic acid, benzoic acid, citric acid, glycolic acid, and mixtures thereof.

In the context of the invention, and unless otherwise mentioned, the term "organophosphate acid" means a phosphoric acid ester comprising at least one —OH radical. For example, methyl phosphate is an organophosphate acid comprising two —OH radicals and has the following structure:

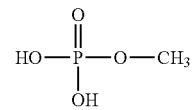

In particular, the organophosphate acids have the following formula:

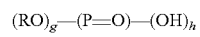

in which:
R is an organic radical, in particular a radical chosen from linear or branched C1-C22 alkyls, cycloalkyls, aryls, and mixtures thereof (said alkyl, cycloalkyl and aryl groups being optionally substituted); and
g and h are integers, with g+h=3 and h=1 or 2.

The organophosphate acids may be chosen, for example, from the group consisting of C1-C22 mono- or dialkyl phosphate acids and mixtures thereof, for instance butyl phosphate, dibutyl phosphate, bis(2-ethylhexyl) phosphate, 2-ethylhexyl phosphate, and mixtures thereof; mono- or diaryl phosphates, and mixtures thereof, for instance monophenyl phosphate, diphenyl phosphate and mixtures thereof; alkyl phenyl phosphates; and mixtures thereof.

In the context of the invention, and unless otherwise mentioned, the term "organophosphonate acid" means a phosphorus-based compound having the following general formula:

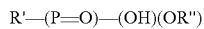

$$R'—(P=O)—(OH)(OR'')$$

in which R' and R" are organic radicals, preferably chosen, independently of each other, from linear or branched C1-C22 alkyls, cycloalkyls, aryls, and mixtures thereof (said alkyl, cycloalkyl and aryl groups being optionally substituted).

Among the organophosphonate acids, examples that may be mentioned include C1-C22 monoalkyl phosphonate acids.

In the context of the invention, and unless otherwise mentioned, the term "phosphonic acid" means a phosphorus-based compound having the following general formula:

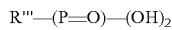

$$R'''—(P=O)—(OH)_2$$

in which R''' is an organic radical, preferably chosen from linear or branched C1-C22 alkyls, cycloalkyls, aryls, and mixtures thereof (said alkyl, cycloalkyl and aryl groups being optionally substituted).

Among the phosphonic acids, examples that may be mentioned include N-alkylaminoalkylphosphonic acids (zwitterions), N,N-dialkylaminoalkylphosphonic acids (zwitterions), C1-C20 alkylphosphonic acids, for instance methylphosphonic acid, ethylphosphonic acid, propylphosphonic acid, butylphosphonic acid, t-butylphosphonic acid, isobutylphosphonic acid, hexylphosphonic acid, 2-ethylhexylphosphonic acid and linear or branched higher homologs, benzylphosphonic acid, phenylphosphonic acid, tolylphosphonic acid or xylylphosphonic acid.

Examples of organic acid catalysts that may be mentioned include Nacure® 155 (dinonylnaphthalenedisulfonic acid, containing 55% active material in isobutanol) sold by King Industries, Nacure® 1051 (dinonylnaphthalenesulfonic acid, containing 50% active material in 2-butoxyethanol) sold by King Industries, Nacure® 5076 (dodecylbenzenesulfonic acid, containing 70% active material in isopropanol) sold by King Industries, K-Cure® 1040 (para-toluenesulfonic acid, containing 40% active material in isopropanol) sold by King Industries, Nacure® 4000 (mixture of mono- and dialkyl phosphate acids, 100% active material) sold by King Industries.

The acid derivatives according to the invention may be acid anhydrides, acid esters or acid ammonium salts, the acid being as described above.

The acid derivatives are in particular "masked" or "latent" acids which advantageously make it possible to release the acid by thermal activation (for example at a temperature ranging from 70° C. to 170° C., preferably at a temperature ranging from 90° C. to 120° C.) or by hydrolysis, or by photoactivation, preferably by thermal activation. The masked acid advantageously makes it possible to release the acid which is the species having the catalytic activity. For example, the ammonium salt formed between aminomethylpropanol and para-toluenesulfonic acid is a masked acid (acid derivative) which, by thermal activation, releases the para-toluenesulfonic acid.

The acid derivatives may be prepared via any means known to those skilled in the art starting with the corresponding acid, for example by using typical acid/base reactions. For example, the process for making an ester typically involves the condensation of an acid compound with a compound comprising a hydroxyl group, for instance an alcohol, or with a compound of oxirane type. The ammonium salts may be prepared from any abovementioned acid, with ammonia or with a primary, secondary or tertiary amine. The amines may optionally comprise at least one functional group such as a hydroxyl group (alkanolamines), a C1-C4 alkyl group. The ammonium salts (zwitterions) may also be prepared by modifying the pH of a solution containing, for example, N-alkylaminoalkylphosphonic acids, N,N-dialkylaminoalkylphosphonic acids, N-alkylaminoalkylsulfonic acids or N,N-dialkylaminoalkylsulfonic acids.

Preferably, the catalyst is an ammonium salt of a sulfonic acid (the sulfonic acid being as described above), an ammonium salt of a phosphonic acid (the phosphonic acid being as described above), an ammonium salt of an organophosphonate acid (the organophosphonate acid being as described above), or an ammonium salt of an organophosphate acid (the organophosphate acid being as described above).

As amines for the preparation of the ammonium salts, examples that may be mentioned include 2-amino-2-methyl-1-propanol, triethylamine, aniline, pyridine, dimethylaminoethanol, alkypyridines, diisopropanolamine, dimethylethanolamine, triethanolamine, oxazolidines, bicyclic oxazolidines, amidines, diazabicyclooctanes, guanidines, N-alkylmorpholines, aminopyridines, aminoalkylpyridines, aminopyrrolidines, indazole, imidazole, pyrazole, pyrazine, pyrimidine, purine, imidazoline, pyrazoline, piperazine, aminomorpholine, aminoalkylmorpholines, and mixtures thereof. Preferably, the amines are tertiary amines.

Examples of acid derivatives that may be mentioned include Nacure® 3327 or Nacure® 3525 (dinonylnaphthalenedisulfonic acid masked with an amine, containing 25% active material in isopropanol and isobutanol) sold by King Industries, Nacure® 1557 or Nacure® 1953 (dinonylnaphthalenesulfonic acid masked with an amine, containing 25% active material in a mixture of butanol and 2-butoxyethanol) sold by King Industries, Nacure® 5225 or Nacure® 5528 or Nacure® 5925 (dodecylbenzenesulfonic acid masked with an amine, containing 25% active material in isopropanol) sold by King Industries, Nacure® 2107 or Nacure® 2500 (para-toluenesulfonic acid masked with an amine, containing 25% or 26% active material in isopropanol) sold by King Industries, Nacure® 2501 or Nacure® 2530 (para-toluenesulfonic acid masked with an amine, containing 25% active material in a mixture of isopropanol and methanol) sold by King Industries, Nacure® 4167 (dialkyl phosphate masked with an organic amine, containing 25% active material in a mixture of isopropanol and isobutanol) sold by King Industries, Nacure® 4575 (phosphate acid blocked with an amine, containing 25% active material in a mixture of methanol and butanol) sold by King Industries.

Preferably, the catalyst is chosen from the group consisting of organometallic compounds (in particular aluminum-based coordination complexes, and more particularly aluminum chelates), orthophosphoric acid, organophosphate acids (preferably C1-C22 mono- or dialkyl phosphate acid and mixtures thereof), ammonium salts (in particular of sulfonic acid or of organophosphate acid), and mixtures thereof.

Even more preferably, the catalyst is chosen from the group consisting of orthophosphoric acid, organophosphate acids (preferably C1-C22 mono- or dialkyl phosphate acid and mixtures thereof), ammonium salts (in particular of sulfonic acid or of organophosphate acid).

Other Additives:

The heat-crosslinkable adhesive composition according to the invention may also comprise one or more additives chosen from the group consisting of moisture absorbers, plasticizers, antioxidants, pigments, colorants, adhesion promoters, UV stabilizers, flame-retardant additives, or else fillers such as carbonate-based fillers, for example of calcium carbonate type.

The moisture absorber (or desiccant) may be chosen, for example, from non-polymeric hydrolyzable alkoxysilane derivatives, with a molecular mass of less than 500 g/mol, preferably chosen from trimethoxysilane and triethoxysilane derivatives. Such an agent can typically extend the storage life of the composition during storage and transportation before it is used. Mention may be made, for example, of γ-methacryloxypropyltrimethoxysilane (for example available, under the trade name Silquest® A-174, from Momentive), methacryloxymethyltrimethoxysilane (for example available, under the name Geniosil® XL33, from Wacker), vinyltrimethoxysilane, isooctyltrimethoxysilane or phenyltrimethoxysilane.

The content of moisture absorber is preferably less than or equal to 3% by weight, more preferably less than or equal to 2% by weight, relative to the total weight of composition A. When it is present, the moisture absorber may represent, for example, from 0.1% to 3% by weight or from 1% to 2% by weight relative to the total weight of the composition according to the invention.

The composition according to the invention may also comprise a plasticizer.

As examples of plasticizers that may be used, use may be made of any plasticizer usually used in the field of adhesives, for instance phthalates, benzoates, trimethylolpropane esters, trimethylolethane esters, trimethylolmethane esters, glycerol esters, pentaerythritol esters, naphthenic mineral oils, adipates, cyclohexyldicarboxylates, liquid paraffins, natural oils (optionally epoxidized), polypropylenes, polybutylenes, hydrogenated polyisoprenes, and mixtures thereof.

Among the phthalates, examples that may be mentioned include diisononyl phthalate, diisobutyl phthalate, dioctyl phthalate, dicyclohexyl phthalate, diisooctyl phthalate, diisododecyl phthalate, dibenzyl phthalate or butylbenzyl phthalate.

Among the benzoates, examples that may be mentioned include: neopentyl glycol dibenzoate (available, for example, under the name Uniplex® 512 from Lanxess), dipropylene glycol dibenzoate (available, for example, under the name Benzoflex® 9-88SG from Eastman), a mixture of diethylene glycol dibenzoate and of dipropylene glycol dibenzoate (available, for example, under the name K-Flex® 850 S from Kalama Chemical), or a mixture of diethylene glycol dibenzoate, dipropylene glycol dibenzoate and triethylene glycol dibenzoate (available, for example, under the name Benzoflex® 2088 from Eastman).

Among the pentaerythritol esters, examples that may be mentioned include pentaerythrityl tetravalerate (available, for example, under the name Pevalen™ from the company Perstorp).

Among the cyclohexanedicarboxylates, an example that may be mentioned is diisononyl 1,2-cyclohexanedicarboxylate (available, for example, under the name Hexamoll Dinch® from BASF).

The total content of plasticizer(s) in the composition according to the invention may range from 0% to 30% by weight, preferably from 1% to 30% by weight or even, for example, from 1% to 15% by weight relative to the total weight of said composition.

The composition according to the invention may also comprise an antioxidant (also denoted by the term UV stabilizer).

Antioxidants are compounds that may be introduced to protect the composition from degradation resulting from a reaction with oxygen which is liable to be formed by the action of heat or light. These compounds may include primary antioxidants which trap free radicals. The primary antioxidants may be used alone or in combination with other secondary antioxidants or UV stabilizers.

Examples that may be mentioned include Irganox® 1010, Irganox® B561, Irganox® 245, Irganox® 1076 and Irgafos® 168 sold by BASF.

An amount of antioxidant ranging from 0.1% to 3%, preferably from 1% to 3% by weight, on the basis of the total weight of the composition according to the invention is generally used.

The adhesive composition according to the invention may be in the form of a one-component adhesive composition or a multicomponent, preferably two-component, adhesive composition.

I. One-Component Adhesive Composition:

According to a first embodiment, the adhesive composition according to the invention is in the form of a one-component composition.

According to this embodiment, said one-component composition generally comprises:

from 3% to 90% by weight, preferably from 5% to 80% by weight, preferentially from 10% to 70% by weight, advantageously from 20% to 60% by weight, of at least one polymer (A) comprising a hydrolyzable alkoxysilane group;

from 15% to 80% by weight, preferably from 20% to 70%, preferentially from 25% to 70%, in particular from 30% to 60%, advantageously from 40% to 60% by weight of at least one tackifying resin (B);

from 0.1% to 30% by weight, preferably from 1% to 20% by weight, preferentially from 2% to 15% by weight and advantageously from 3% to 12% by weight of at least one silsesquioxane resin (C); and from 0.01% to 10%, preferably from 0.01% to 5%, preferentially from 0.05% to 4%, advantageously from 0.1% to 3%, in particular from 0.5% to 2% by weight of crosslinking catalyst (D);

these weight percentages being indicated on the basis of the total weight of one-component composition.

The one-component composition may be prepared via a process which comprises:

a step of mixing, with the exclusion of air, preferably under an inert atmosphere, the polymer(s) (A) with the tackifying resin(s) (B), and the silsesquioxane resin(s) (C), at a temperature of between 50° C. and 180° C., preferably between 100° C. and 150° C., and then a step of cooling said mixture to a temperature ranging from 50° C. to 130° C., and advantageously about 70° C., and then a step of incorporating, into said mixture, the crosslinking catalyst (D) and, where appropriate, the other optional additives.

II. Multicomponent Adhesive Composition:

According to a second embodiment, the adhesive composition according to the invention is in the form of a multicomponent composition comprising:

- a composition U (as first component) comprising:
  - the polymer(s) (A) comprising a hydrolyzable alkoxysilane group, as defined previously; and
  - the tackifying resin(s) (B) as defined previously; and
- a composition V (as second component) comprising:
  - the crosslinking catalyst(s) (D) as defined previously; and
  - at least one compound (E) chosen from:
    - a compound (E1) with a number-average molecular mass ranging from 300 g/mol to 100 000 g/mol; and
    - a compound (E2) with a vapor pressure at 20° C. of greater than or equal to 0.08 kPa;
    - and also mixtures thereof;
  - the silsesquioxane resin (C) being included in composition U or in composition V.

The various components of said multicomponent adhesive composition are intended to be mixed at the time of performing the crosslinking reaction, in accordance with the process for manufacturing a self-adhesive support described below.

The multicomponent adhesive composition may comprise one or more additional compositions in addition to compositions U and V, said additional composition(s) possibly comprising compound(s) of any type. For example, the multicomponent adhesive composition may comprise an additional composition W comprising at least one tackifying resin, chosen, for example, from those described above for composition U. The multicomponent adhesive composition according to the invention may also comprise a composition W comprising water. The water may be in liquid or gaseous form, or encapsulated, or absorbed, or contained in the chemical structure of a component. The water may be derived from one or more components which may subsequently render it free and available.

The multicomponent adhesive composition according to the invention advantageously leads to high crosslinking rates for the process for manufacturing the self-adhesive support described below. The improved reactivity advantageously make it possible to avoid treatment in an oven, or to reduce the residence time in the crosslinking oven during the preparation of self-adhesive supports, and thus to reach a short residence time in the oven, namely, for example, less than 5 minutes, preferably less than 1 minute, preferentially less than 30 seconds, and advantageously less than 10 seconds. The multicomponent adhesive composition according to the invention thus advantageously leads to high industrial production rates, while at the same time having good self-adhesive properties after crosslinking.

Compositions U and V included in said adhesive composition (before mixing) are stable on storage, at elevated temperature and/or at elevated moisture content. The greater stability over time advantageously allows longer storage and handling with a reduced risk of reaction, degradation or crosslinking of compositions U and V, between their production and their hot application.

The multicomponent adhesive composition according to the invention advantageously allows the formation of a uniform adhesive layer which does not have any problem of uncontrolled and non-homogeneous formation of grains or gels, and/or advantageously allows uniform crosslinking over the entire support layer.

The multicomponent adhesive composition may advantageously comprise a high content of catalyst, without giving rise to setting to a solid in the tubes in which the components of the adhesive circulate during the production of self-adhesive articles.

According to an even more preferred embodiment, the multicomponent adhesive composition according to the invention is a two-component adhesive composition consisting of the abovementioned compositions U and V.

II.1. Composition U:

Composition U generally comprises:
- from 3% to 90% by weight of the polymer(s) (A) comprising a hydrolyzable alkoxysilane group, preferably from 5% to 80%, preferentially from 10% to 70%, advantageously from 20% to 60%;
- from 15% to 80% of the tackifying resin(s) (B), preferably from 20% to 70%, preferentially from 25% to 70%, in particular from 30% to 60%, advantageously from 40% to 60% by weight; and, where appropriate
- from 0.1% to 30% by weight, preferably from 1% to 20% by weight, preferentially from 2% to 15% by weight, advantageously from 3% to 12% by weight, of at least one silsesquioxane resin (C);

these weight percentages being indicated on the basis of the total weight of composition U.

In addition, composition U may also comprise one or more additives, as described previously, chosen from the group consisting of moisture absorbers, plasticizers, antioxidants, pigments, colorants, adhesion promoters, UV stabilizers and fillers.

Composition U may be prepared by mixing all of the components of said composition U, irrespective of the order of incorporation of the various components. Several components of composition U may be mixed together, and then subsequently mixed with other component(s) of said composition U.

The mixing may be performed at a temperature ranging from 23° C. to 200° C.

II.2. Composition V:

Composition V comprises:
- the crosslinking catalyst(s) (D) as defined previously;
- at least one compound (E) chosen from:
  - a compound (E1) with a number-average molecular mass ranging from 300 g/mol to 500 000 g/mol;
  - a compound (E2) with a vapor pressure at 20° C. or equal to 0.08 kPa; and
  - mixtures of (E1) and (E2); and also, where appropriate,
- the silsesquioxane resin (C) as defined previously.

According to one embodiment, composition V comprises:
- a compound (E1);
- a mixture of different compounds (E1);
- a compound (E2);
- a mixture of different compounds (E2); or
- a mixture of at least one compound (E1) and of at least one compound (E2).

II.2.1. Compound (E):

The presence of the compound(s) (E) allows dilution of the crosslinking catalyst (D) in composition V, and thus advantageously allows an increase in the flash point of said composition V. This notably has the effect of advantageously improving the safety of the process for preparing a self-adhesive article.

In addition, the presence of the compound(s) (E), in particular in contents of greater than or equal to 50% by weight of composition V, advantageously makes it possible to reduce the risks of toxicity, during the use, for example, of an organometallic catalyst.

Moreover, the presence of the compound(s) (E) in composition V advantageously allows better dispersion of the catalyst(s) (D) in the two-component adhesive composition (obtained after mixing compositions U and V). This better dispersion advantageously leads to coating with a uniform adhesive layer which does not present any problem of formation of grains and/or gels that impair the optical quality of the final coatings, or which hinder the defect-free application of the coating onto the surfaces to be bonded.

Furthermore, the presence of the compound(s) (E) in composition V advantageously makes it possible to add very small amounts of catalyst (D).

The compound(s) (E) are advantageously inert with respect to the catalyst (D), i.e. they do not react with said catalyst.

II.2.1.1 Compound (E1):

Compound (E1) preferably has a number-average molecular mass ranging from 1000 g/mol to 50 000 g/mol, preferably from 1000 g/mol to 20 000 g/mol, in particular from 2000 to 20 000 g/mol, preferentially from 3000 to 20 000 g/mol, for example from 4000 to 18 000 g/mol, advantageously from 5000 g/mol to 10 000 g/mol, and notably from 7000 g/mol to 9000 g/mol.

The number-average molecular mass of compound (E1) may be measured by methods that are well known to those skilled in the art, for example by size exclusion chromatography using polystyrene standards.

Compound (E1) preferably has a viscosity at 23° C. ranging from 10 mPa·s to 100 000 mPa·s, in particular from 500 to 50 000 mPa·s, preferably from 500 to 20 000 mPa·s, preferentially from 500 to 15 000 mPa·s, advantageously from 500 to 10 000 mPa·s, for example from 1000 to 5000 mPa·s, preferably from 1000 to 3000 mPa·s.

According to the invention, compound (E1) may be chosen from the group consisting of:
(E1-1) polyols;
(E1-2) organosilanes;
(E1-3) tackifying resins;
(E1-4) polyol esters;
(E1-5) monosilyl or disilyl polymers;
(E1-6) polyetheramines;
and also mixtures thereof.

According to the invention, compound (E1) may be a reactive or nonreactive compound, also denoted by the term reactive or nonreactive diluent. The term "reactive" means that it comprises at least one function which can react with the alkoxysilane function(s) of the silyl polymer of composition U, during the mixing of compositions U and V. For example, the polyols, the tackifying resins and the polyol esters are nonreactive compounds. For example, the organosilanes and the monosilyl or disilyl polymers are reactive compounds.

The use of the reactive compound (E1) advantageously makes it possible to lead to adhesive compositions after mixing which have better heat resistance.

Polyols (E1-1):

According to one embodiment, compound (E1) is a polyol chosen from the group consisting of polyether polyols, polyester polyols, polytetrahydrofuran polyols, polyacrylate polyols, polycarbonate polyols, polyether carbonate polyols, polyester carbonate polyols, polyacetal polyols, poly(ester-amide) polyols, polythio ether polyols, polyolefin polyols, and mixtures thereof, compound (E1) preferably being chosen from polyether polyols, polyester polyols and mixtures thereof.

In the context of the invention, the term "polyol" means any linear or branched, cyclic or acyclic, saturated or unsaturated, aromatic or aliphatic, hydrocarbon-based compound comprising at least two hydroxyl (OH) functions. The polyol may be optionally substituted with a functional group, and/or may comprise one or more divalent groups chosen from ether (—O—), and carboxyl (—C(=O)O— or —OC(=O)—) groups.

The polyols may be chosen from diols, triols, and mixtures thereof.

According to one embodiment, compound (E1) is a polyol chosen from the group consisting of polyols with an $I_{OH}$ ranging from 5 to 500 mg KOH/g, preferably from 5 to 250 mg KOH/g, preferentially from 6 to 50 mg KOH/g, in particular from 10 to 28 mg KOH/g.

The hydroxyl number $I_{OH}$ of a polyol represents the number of hydroxyl functions per gram of polyol, and is expressed in the form of the equivalent number of milligrams of potassium hydroxide (KOH) used in the assay of the hydroxyl functions, determined experimentally by titrimetry according to the standard ISO 14900:2001. In the case of a mixture of polyols, the $I_{OH}$ may also be calculated from the known $I_{OH}$ values of each of the polyols and from their respective weight contents in said mixture.

The polyacetal polyols may be, for example, those prepared by reaction between a glycol (for instance diethylene glycol) with formaldehyde. Polyacetals may also be prepared by polymerization of cyclic acetals.

The polyolefin polyols may be butadiene homopolymers and copolymers comprising hydroxyl end groups.

The polycarbonate polyols may be those obtained by reaction between at least one diol comprising from 2 to 10 carbon atoms (for instance 1,3-propanediol, 1,4-butanediol, 1,6-hexanediol, diethylene glycol or tetraethylene glycol) with at least one diaryl carbonate comprising from 3 to 20 carbon atoms, for instance diphenyl carbonate, or with phosgene.

The polyester polyols may be:
polyester polyols of natural origin, such as castor oil;
polyester diols derived from a polymerization with ring opening of at least one lactone ring (preferably comprising from 3 to 7 carbon atoms) with at least diol, such as polycaprolactone polyols;
polyester polyols resulting from condensation between:
at least one dicarboxylic acid or at least one of the corresponding anhydrides or diesters thereof; and
at least one diol.

The dicarboxylic acid(s) that may be used for the synthesis of the abovementioned polyester polyols preferably comprise from 3 to 40 carbon atoms, and preferentially from 6 to 10 carbon atoms.

Preferably, the dicarboxylic acid(s) that may be used for the synthesis of the abovementioned polyester polyols are chosen from the group consisting of malonic acid, succinic acid, fumaric acid, glutaric acid, adipic acid, 1,3- or 1,4-cyclohexanedicarboxylic acid, 3-methyl-1,5-pentanedicarboxylic acid, 1,10-decanedicarboxylic acid, 1,12-dodecanedicarboxylic acid, 1,18-octadecanedicarboxylic acid, methyltetrahydrophthalic acid, hexahydrophthalic acid, tetrahydrophthalic acid, azelaic acid, sebacic acid, and mixtures thereof.

The diol(s) that may be used for the synthesis of the abovementioned polyester polyols may be chosen from polyalkylene diols, polyoxyalkylene diols, and mixtures thereof, the alkylene (saturated) part of these compounds preferably being linear or branched and preferably comprises from 2 to 40 carbon atoms and preferentially from 2 to 8 carbon atoms.

Preferably, the diol(s) that may be used for the synthesis of the abovementioned polyester polyols are chosen from the group consisting of ethylene glycol, diethylene glycol, triethylene glycol, neopentyl glycol, 1,6-hexanediol, butanediol, propylene glycol, dipropylene glycol, tetraethylene glycol, tripropylene glycol, 3-methyl-1,5-pentanediol, 2,2-dimethyl-1,3-propanediol, and mixtures thereof.

Among the polyester polyols, examples that may be mentioned include the following products with a hydroxyl functionality equal to 2:

Tone®0240 (available from Union Carbide), which is a caprolactone with a number-average molecular mass of about 2000 Da, an $I_{OH}$ equal to 56, and with a melting point of about 50° C.;

Dynacoll® 7381 (available from Evonik), the number-average molecular mass of which is about 3500 Da, of $I_{OH}$ equal to 30, and with a melting point of about 65° C.;

Dynacoll® 7360 (available from Evonik) resulting from the condensation of adipic acid with hexanediol, the number-average molecular mass of which is about 3500 Da, of $I_{OH}$ equal to 30, and with a melting point of about 55° C.;

Dynacoll® 7330 (available from Evonik), the number-average molecular mass of which is about 3500 Da, of $I_{OH}$ equal to 30, and with a melting point of about 85° C.;

Dynacoll® 7363 (available from Evonik) resulting from the condensation of adipic acid with hexanediol, the number-average molecular mass of which is about 5500 Da, of $I_{OH}$ equal to 21, and with a melting point of about 57° C.

In the context of the invention, the term "hydroxyl functionality of a polyester polyol" means the mean number of hydroxyl functions per mole of polyester polyol.

The polyester polyols may be amorphous or crystalline, preferably amorphous.

Preferably, the polyester polyols are those obtained by condensation reaction between adipic acid and a mixture of neopentyl glycol, ethylene glycol and 1,6-hexanediol; or between adipic acid and 3-methyl-1,5-pentanediol.

The polyether polyols may be oxyalkyl derivatives of diols (for instance ethylene glycol, propylene glycol, neopentyl glycol), of triols (for instance glycerol, trimethylolpropane, hexane-1,2,6-triol), or of tetraols (for instance pentaerythritol). The polyether polyols may be obtained by polymerization of the corresponding alkylene oxide in the presence of a catalyst.

Preferably, the polyether polyols are polypropylene glycols (or PPG), in particular having a hydroxyl functionality equal to 2 or 3, and preferably a polydispersity index ranging from 1 to 1.6, preferably from 1 to 1.4.

In the context of the invention, the term "polydispersity index" means the ratio between the weight-average molecular mass and the number-average molecular mass, determined notably by GC.

Among the polypropylene glycols with a hydroxyl functionality equal to 2, mention may be made of:

Voranol® EP 1900: difunctional PPG with a number-average molecular mass of about 4008 g/mol, and a hydroxyl number $I_{OH}$ equal to 28 mg KOH/g;

Acclaim® 8200: difunctional PPG with a number-average molecular mass of 8016 g/mol, and a hydroxyl number $I_{OH}$ equal to 14 mg KOH/g;

Acclaim® 12200: difunctional PPG with a number-average molecular mass of 11 222 g/mol, and a hydroxyl number $I_{OH}$ equal to 10 mg KOH/g;

Acclaim® 18200: difunctional PPG with a number-average molecular mass of 17 265 g/mol, and a hydroxyl number $I_{OH}$ equal to 6.5 mg KOH/g.

Among the polypropylene glycols with a hydroxyl functionality equal to 3, mention may be made of:

Voranol® CP 755: trifunctional PPG with a number-average molecular mass of about 710 g/mol, and a hydroxyl number $I_{OH}$ equal to 237 mg KOH/g;

Voranol® CP 3355: trifunctional PPG with a number-average molecular mass of about 3544 g/mol, and a hydroxyl number $I_{OH}$ equal to 47.5 mg KOH/g;

Acclaim®6300: trifunctional PPG with a number-average molecular mass of about 5948 g/mol, and a hydroxyl number $I_{OH}$ equal to 28.3 mg KOH/g.

In the context of the invention, the term "hydroxyl functionality of a polyether polyol" means the mean number of hydroxyl functions per mole of polyether polyol.

According to a preferred embodiment, the polyether polyols have a functionality equal to 2 and a number-average molecular mass preferably ranging from 3000 to 20 000 g/mol, preferentially from 4000 to 19 000 g/mol, in particular from 5000 to 15 000 g/mol, and advantageously from 7000 to 13 000 g/mol.

According to a preferred embodiment, the polyether polyols have a functionality equal to 3 and a number-average molecular mass preferably ranging from 500 to 20 000 g/mol, preferentially from 500 to 10 000 g/mol, in particular from 500 to 5000 g/mol, and advantageously from 500 to 4000 g/mol.

Ormanosilanes (E1-2):

According to one embodiment, compound (E1) is chosen from organosilanes, in particular chosen from the group consisting of aminosilanes, mercaptosilanes, glycidoxysilanes, vinylsilanes, epoxy silanes, (meth)acrylate silanes, glycoxysilanes, anhydro silanes, and mixtures thereof.

In the context of the invention, the term "organosilane" means a compound comprising an organic group bonded to the Si atom by means of an Si—C bond.

Preferably, the organosilanes comprise at least one, preferably at least two or even three, alkoxy groups connected to the Si atom by means of Si—O bonds.

The organosilanes may be monomers or oligomers.

Among the organosilanes, examples that may be mentioned include 3-aminopropylmethyldimethoxysilane, 3-aminopropyltrimethoxysilane (for example available under the name Silquest® A1110 from the company Momentive), 3-glycidoxypropyltrimethoxysilane (for example available under the name Silquest® A-187 from the company Momentive), 3-mercaptopropyltrimethoxysilane (for example available under the name Silquest® A-189 from the company Momentive), mercaptopropyltriethoxysilane, mercaptopropylmethyldimethoxysilane, mercaptopropylmethyldiethoxysilane, mercaptomethyltrimethoxysilane, mercaptomethyltriethoxysilane, N-aminoethyl-3-aminopropyltrimethoxysilane, 3-methacryloxypropyltrimethoxysilane (for example available under the name Silquest® A-174NT from the company Momentive), tris(3-trimethoxysilylpropyl) isocyanurate (for example available under the name Silquest® Y-11597 from the company Momentive), bis(3-triethoxysilylpropyl) polysulfide (for example available under the name Silquest® A-1289 from the company Momentive), bis(3-triethoxysilyl) disulfide (for example available under the name Silquest® A-1589 from the company Momentive), β-(3,4-epoxycyclohexyl)ethyltrimethoxysilane (for example available under the name Silquest® A-186 from the company Momentive), bis(triethoxysilyl) ethane (for example available under the name Silquest®

Y-9805 from the company Momentive), gamma-isocyanatopropyltrimethoxysilane (for example available under the name Silquest® A-Link 35 from the company Momentive), (methacryloxymethyl)tri(m)ethoxysilane (for example available under the names Geniosil® XL 33, or Geniosil® XL 36 from the company Wacker), (methacryloxymethyl)(m)ethyldimethoxysilane (for example available under the names Geniosil® XL 32, or Geniosil® XL34 from the company Wacker), (isocyanatomethyl)methyldimethoxysilane (for example available under the name Geniosil® XL 42 from the company Wacker), (isocyanatomethyl)trimethoxysilane (for example available under the name Geniosil® XL 43 from the company Wacker), (methacryloxymethyl)methyldiethoxysilane, 2-acryloxyethylmethyldimethoxysilane, 2-methacryloxyethyltrimethoxysilane, 3-acryloxypropylmethyldimethoxysilane, 2-acryloxyethyltrimethoxysilane, 2-methacryloxyethyltriethoxysilane, 3-acryloxypropyltrimethoxysilane, 3-acryloxypropyltripropoxysilane, 3-methacryloxypropyltriethoxysilane, 3-methacryloxypropyltriacetoxysilane, 3-methacryloxypropylmethyldimethoxysilane, glycoxysilane derived from the reaction between 2-methyl-1,3-propanediol and vinyltrimethoxysilane, and mixtures thereof.

Tackifying Resins (E1-3):

According to one embodiment, compound (E1) is chosen from tackifying resins in particular having a number-average molecular mass ranging from 100 g/mol to 6000 g/mol, preferably from 300 g/mol to 4000 g/mol.

The tackifying resin may be, for example, any tackifying resin as defined for the tackifying resin (B).

Polyol Esters (E1-4):

According to one embodiment, compound (E1) is chosen from polyol esters. The polyol esters may be prepared, for example, by esterification reaction of polyol, for example of tetrol, for instance of pentaerythritol.

An example of a polyol ester that may be mentioned is pentaerythrityl tetravalerate.

Monosilyl or Disilyl Polymers (E1-5):

According to one embodiment, compound (E1) is chosen from monosilyl polymers, disilyl polymers and mixtures thereof.

The disilyl polymers may be any of those mentioned previously for the definition of the silyl polymer (A), in particular the polymers of the abovementioned formulae (II'), (III') or (IV').

Preferably, the monosilyl polymers comprise a group of the abovementioned formula (I).

Polyetheramines (E1-6):

In the context of the invention, and unless otherwise mentioned, the term "polyetheramines" means compounds comprising a polyether main chain, and at least one amine function (or even at least two amine functions).

According to one embodiment, compound (E1) is chosen from polyetheramines.

Among the polyetheramines, mention may be made in particular of the Jeffamine products sold by the company Huntsman, for instance the polyetherdiamine of formula: $H_2N$—$CH_2$—$CH_2$—O—$CH_2$—$CH_2$—O—$CH_2$—$CH_2$—$NH_2$ having a primary alkalinity of 13.49 meq/g (available, for example, under the trade name Jeffamine® ED 148 from the company Huntsman).

II.2.1.2 Compound (E2):

Compound (E) included in composition V may also be a compound (E2) (denoted by the term "nonreactive diluent") having a vapor pressure at 20° C. or equal to 0.08 kPa.

Compound (E2) preferably has a vapor pressure at 20° C. of between 0.08 kPa and 13 kPa, preferentially between 0.08 kPa and 8 kPa, even more preferentially between 0.1 kPa and 5 kPa.

Compound (E2) is chosen from alcohols, for example from isopropanol, isobutanol, butanol, methanol, 2-butoxyethanol, and mixtures thereof.

Advantageously, compound (E2) is evaporated during the application of the adhesive composition to a support layer.

According to a preferred embodiment, when the crosslinking catalyst included in composition V is an acid derivative as described above, compound (E) is a compound (E1).

According to a preferred embodiment, when the crosslinking catalyst is not an acid derivative as described above, compound (E) is a compound (E1) or (E2).

Preferably, when the catalyst is an inorganic acid, for instance orthophosphoric acid, compound (E) is not chosen from polyols.

II.2.2. Weight Content of the Ingredients of Composition V:

When it does not comprise the silsesquioxane resin (C), composition V generally comprises:
  from 0.01% to 95% by weight of the crosslinking catalyst(s) (D), preferably from 1% to 90%, preferentially from 5% to 90%, more preferentially from 10% to 80%, even more preferentially from 10% to 70%, advantageously from 20% to 60%, in particular from 20% to 50%; and
  from 5% to 99.99% by weight of the compound(s) (E), preferably from 10% to 99%, for example from 10% to 95%, preferentially from 20% to 90%, even more preferentially from 30% to 80%, advantageously from 40% to 70%;
  these weight percentages being indicated on the basis of the total weight of composition V.

When composition V also comprises the silsesquioxane resin (C), the contents of ingredients of said composition V may then range:
  from 0.01% to 95% by weight of the crosslinking catalyst(s) (D), preferably from 1% to 90%, preferentially from 5% to 90%, more preferentially from 10% to 80%, even more preferentially from 10% to 70%, advantageously from 20% to 60%, in particular from 20% to 50%;
  from 0% to 99.99% by weight of the compound(s) (E), preferably from 10% to 99%, for example from 10% to 95%, preferentially from 20% to 90%, even more preferentially from 30% to 80%, advantageously from 40% to 70%; and
  from 0.1% to 99.99% by weight of the resin (C), preferably from 2% to 99%, for example from 10% to 95%, preferentially from 20% to 90%, even more preferentially from 30% to 80%, advantageously from 40% to 85%;
  these weight percentages being indicated on the basis of the total weight of composition V.

In the context of the invention, and unless otherwise mentioned, the mass content of catalyst is the solids content (referred to as active material).

Preferably, when the catalyst (D) is chosen from organometallic compounds, the content of catalyst in composition V ranges from 15% to 90%, preferably from 30% to 60%, advantageously from 45% to 55% by weight relative to the total weight of composition V.

Preferably, when the catalyst (D) is chosen from acids, and notably inorganic acids, the content of catalyst in composition V ranges from 2% to 60%, preferably from 5% to 50%, in particular from 5% to 30%, advantageously from 5% to 20% by weight relative to the total weight of composition V.

Preferably, when the catalyst (D) is chosen from acid derivatives, and notably ammonium salts of sulfonic acids or ammonium salts of organophosphate acids, the content of catalyst in composition V ranges from 5% to 60%, preferably from 10% to 50%, advantageously from 15% to 40%, in particular from 20% to 30% by weight relative to the total weight of composition V.

According to one embodiment, the crosslinking catalyst (s) (D): compound(s) (E) ratio in composition B ranges from 0.01:99.99 to 95:5, preferably from 5:95 to 95:5, in particular from 5:95 to 60:40, preferentially from 10:90 to 50:50, advantageously from 20:80 to 50:50.

II.2.3. Optional Additives Included in Ia Composition V:

Composition V may comprise water. The water may originate from the compounds of composition V, and/or may be added to composition V.

The water content in composition V may range from 0.05% to 50% by mass, preferably from 0.1% to 30% by mass, preferentially from 0.5% to 15% by mass, advantageously from 0.5% to 10% by mass, in particular from 0.5% to 5% by mass relative to the total mass of composition V.

According to one embodiment, composition V comprises water, in particular when compound (E) comprises at least one compound (E1) which is not an organosilane or a monosilyl or disilyl polymer.

According to one embodiment, composition V comprises water, in particular when compound (E) is a compound (E2).

According to one embodiment, composition V is free of water. The term "free of water" means a water content of less than or equal to 200 ppm, preferably less than or equal to 100 ppm, for example less than or equal to 50 ppm, or even less than or equal to 20 ppm. Preferably, composition V is free of water, when compound (E) comprises at least one compound (E1) chosen from organosilanes, monosilyl or disilyl polymers, and mixtures thereof.

The water content may be measured, for example by Karl Fischer assay according to the standard ISO 760.

The water contained in composition V may be in liquid or gaseous form, or encapsulated, or absorbed, or contained in the chemical structure of a component which can subsequently render it free and available.

The water may be derived from one or more components of said composition V.

Composition V may comprise at least one additive chosen from the group mentioned previously and consisting of moisture absorbers, plasticizers, antioxidants, pigments, colorants, adhesion promoters, UV stabilizers and fillers.

Composition V may contain a compound chosen from $NH_4F$, $Bu_4NF$, $HF$, $BF_3$, $Et_2NSF_3$, $HSO_3F$, a polymer of the type such as polyether polyol PPG comprising at least one fluoro group, a compound bearing at least one Si—F bond, and mixtures thereof.

Composition V may be prepared by mixing all of the components of said composition, irrespective of the order of incorporation of the various components. Several components of composition V may be mixed together, and then subsequently mixed with other component(s) of said composition V.

The mixing may be performed at a temperature ranging from 23 to 200° C.

II.2.4. Properties of Composition V:

According to one embodiment, composition V has a viscosity at 23° C. which ranges from 3 mPa·s to 50 000 mPa·s, preferably from 600 mPa·s to 25 000 mPa·s, preferentially from 800 mPa·s to 16 000 mPa·s, advantageously from 1000 mPa·s to 5000 mPa·s, for example from 1100 mPa·s to 2000 mPa·s, in particular from 1200 mPa·s to 1500 mPa·s.

According to one embodiment, composition V has a viscosity at a temperature ranging from 40° C. to 160° C., preferably from 60° C. to 100° C., which ranges from 50 mPa·s to 500 000 mPa·s, preferably from 600 mPa·s to 100 000 mPa·s, preferentially from 1200 mPa·s to 50 000 mPa·s, advantageously from 1200 mPa·s to 10 000 mPa·s, for example from 1200 mPa·s to 5000 mPa·s.

The constituents of composition V are preferably chosen such that composition V is advantageously stable over time. Preferably, composition V is such that the ratio $$(V_{final} - V_{initial})/V_{initial}$$

is less than or equal to 30%, preferably less than or equal to 20%, preferentially less than or equal to 10%, with:

$V_{final}$ being the viscosity of composition V after heating at 40° C. for 28 days, measured at 23° C.;

$V_{initial}$ being the viscosity of composition V before said heating, measured at 23° C.

The crosslinking catalyst (D) is advantageously chosen so as to be soluble in the abovementioned compound(s) (E) (and, where appropriate, (C)), advantageously to form a composition V which is homogeneous, notably on storage at 23° C. or after heating at 40° C. for 28 days. The term "homogeneous" means that there is no phase separation (flocculation or sedimentation) between the catalyst(s) and the compound(s) C in composition V.

II.3. Other Features of the Multicomponent Adhesive Composition:

According to a preferred variant of said multicomponent adhesive composition, the weight of composition V divided by the total weight of said multicomponent, preferably two-component, adhesive composition ranges from 0.02% to 40%, preferably from 0.05% to 40%, preferentially from 0.05% to 20%, more preferentially from 0.05% to 10% and even more preferentially from 0.05% to 5%.

The catalyst included in the multicomponent adhesive composition is the crosslinking catalyst (D) included in composition V.

The total content of crosslinking catalyst (D) in the multicomponent, and preferably two-component, adhesive composition according to the invention may range from 0.01% to 10%, preferably from 0.01% to 5%, preferentially from 0.05% to 4%, advantageously from 0.1% to 3%, in particular from 0.5% to 2% by weight, relative to the total weight of said two-component adhesive composition.

According to one embodiment, when the crosslinking catalyst (D) is chosen from acids and derivatives thereof, its total content in the multicomponent, preferably two-component, adhesive composition is less than or equal to 1%, preferably less than or equal to 0.5%, advantageously less than or equal to 0.2%, preferentially less than or equal to 0.1%, or even less than or equal to 0.05%, relative to the total weight of said composition.

Preferably, the adhesive composition according to the invention is packaged in a kit comprising at least two separate compartments, namely a first compartment for composition U and a second compartment for composition V, and optionally other compartments for additional compositions.

Kit:

The present invention also relates to a kit comprising at least the abovementioned composition U and composition V in two separate compartments. The compartments may be, for example, drums, cartridges or bags. When the multicomponent adhesive composition comprises other compositions, they are contained in other compartments of the kit.

Self-Adhesive Article:

A subject of the present invention is also a self-adhesive article comprising a support layer coated with a self-adhesive layer, characterized in that said self-adhesive layer consists of the adhesive composition according to the invention in crosslinked form.

For the purposes of the present invention, the term "self-adhesive article" includes any article that can be adhesively bonded to a surface solely by the action of pressure with the hand or an item of equipment, without the use of additional glues or adhesives.

The self-adhesive article is a pressure-sensitive self-adhesive article.

The support layer coated with a self-adhesive layer is also denoted by the term "self-adhesive support".

These articles notably have the aim of being applied to a surface to be bonded so as to bring together, maintain, fix, or simply immobilize, expose forms, logos, images or information. These articles may be used in many fields, such as the medical field, clothing, packaging, motor vehicles (for example for attaching logos, lettering, interior soundproofing, interior fitting, bonding in the passenger compartment) or construction (for example for sound and thermal insulation, the assembling of windows). They may be fashioned as a function of their final application, for example in the form of tapes, such as tapes for industrial use, tapes for do-it-yourself work or for fixing use on worksites, single-sided or double-sided tapes, or in the form of labels, bandages, dressings, patches or graphic films.

According to one embodiment, the self-adhesive article is a self-adhesive multilayer system, and in particular a self-adhesive label or tape, which may be single-sided or double-sided.

The material that may be used for the support layer may be, for example, any type of rigid or flexible support. Examples that may be mentioned include supports of the type such as foams, felts, nonwoven supports, plastics, membranes, papers or a film of a polymer material with one or more layers, notably a nonstick protective paper or plastic film.

The support layer is made of a material chosen, for example, from polyolefins, such as polyethylene, including high-density polyethylene, low-density polyethylene, linear low-density polyethylene and linear ultra-low-density polyethylene; polypropylene and polybutylenes; polystyrene; natural or synthetic rubber; vinyl copolymers, such as polyvinyl chloride, which may or may not be plasticized, and poly(vinyl acetate); olefinic copolymers, such as ethylene/methacrylate copolymers, ethylene/vinyl acetate copolymers, acrylonitrile/butadiene/styrene copolymers, and ethylene/propylene copolymers; acrylic polymers and copolymers; polyurethanes; polyethers; polyesters; and mixtures thereof. Preferably, the support layer is based on acrylic polymers, polyethylene (PE), polypropylene (PP), which may be oriented, non-oriented or bioriented, polyimide, polyurethane, polyester such as polyethylene terephthalate (PET), or paper.

According to one embodiment, the self-adhesive article obtained from the adhesive composition according to the invention comprises a permanent support layer coated with an adhesive layer. Preferably, the adhesive layer is also coated with a nonstick protective paper or plastic film, which is preferably silicone-treated.

According to another embodiment, the self-adhesive article obtained from the adhesive composition according to the invention comprises a nonpermanent support which consists of a first nonstick protective paper or plastic film, which is preferably silicone-treated, said layer being coated with an adhesive layer, which itself may also be coated with a second nonstick protective paper or plastic film. This embodiment is particularly suitable for the assembly of windows by bonding, more particularly for the assembly of the rigid panel consisting of the double or triple glazing with the window frame. According to this embodiment, said nonpermanent support layer is intended to be removed by the user at the moment of applying the self-adhesive article for the purpose of assembling the window.

As an alternative to the nonstick protective film, the rear face of the permanent support layer, which is not coated with the adhesive layer, may have a nonstick surface, for example a silicone-treated protective layer.

According to another embodiment, the permanent support layer is coated on both faces with an adhesive composition, which may be identical or different, at least one of the two adhesive compositions being according to the invention, advantageously leading to the manufacture of "double-sided" tapes.

Preferably, the support layer has a thickness ranging from 10 microns to 50 mm, more preferably ranging from 10 microns to 20 mm, preferably ranging from 20 microns to 10 mm, more preferably ranging from 20 microns to 1 mm.

In certain specific cases, it is necessary to perform a surface treatment on the support layer to increase the attachment of the adhesive layer during the step of coating thereon.

The self-adhesive article according to the invention can thus bond two substrates. The substrate onto which the self-adhesive article is intended to be applied (referred to as the "substrate to be bonded") may be flexible or rigid. In particular, it may have the same flexibility properties as the support layer described above, so as to be rolled up and packaged in the form of a reel, for example as described previously.

Alternatively, the substrate to be bonded may be rigid. In this case, the substrate cannot be rolled up and packaged in the form of a reel, for example as described previously. The substrate to be bonded may be chosen, for example, from concrete, paper, substrates of polyolefin type, glass, ceramic and metals, notably aluminum.

The self-adhesive layer, which consists of the adhesive composition according to the invention in the crosslinked state, and which covers the support layer, in the self-adhesive article according to the invention may have a very variable thickness, ranging from 10 μm to 5000 μm, preferably.

A thickness ranging from 10 μm to 100 μm and preferably from 20 to 50 μm is more particularly preferred in the case of self-adhesive labels, whereas a thickness ranging in a much broader interval of from 3 to 5000 μm may be encountered for self-adhesive tapes.

According to one embodiment, the self-adhesive article also comprises a protective nonstick layer (release liner).

According to one embodiment, said nonstick layer is applied to the adhesive layer, after crosslinking of the adhesive composition.

The support layer may be covered on one of its two faces, the rear face which is not coated with the adhesive layer, with a protective nonstick layer, for example with a silicone film. In this way, the self-adhesive article can be wound up on itself and then unwound without any problem by virtue of the absence of adhesion of the adhesive layer to the silicone-treated face.

Process for Manufacturing the Self-Adhesive Article:

A subject of the present invention is also a process for manufacturing the self-adhesive article as defined previously, said process being characterized in that it comprises:

(a) preheating to a temperature of between 4° and 130° C. of the heat-crosslinkable adhesive composition, as defined previously;
(b) application of said composition by coating onto a bearing surface;
(c) crosslinking of said composition, by heating to a temperature ranging from 50 to 200° C.; and then
(d) laminating or transferring the layer of crosslinked adhesive composition onto a support layer or onto a nonstick protective film.

When the heat-crosslinkable adhesive composition is, in accordance with the first embodiment described in point I, a one-component composition, it is said one-component composition which is, in accordance with step (a), preheated and then, in accordance with step (b), applied to the bearing surface and, finally, in accordance with step (c), crosslinked.

When the heat-crosslinkable adhesive composition is, in accordance with the second embodiment described in point II, a multicomponent composition and preferably a two-component composition, the preheating in accordance with step (a) relates to each of the components of said composition.

Preferably, the preheating relates to each of the two compositions U and V of the two-component composition.

The preheating step (a) is then followed by a step (a') of mixing compositions U and V at a temperature ranging from 40 to 130° C., the composition resulting from the mixture formed then being applied, in accordance with step (b), to the bearing surface, and then crosslinked in accordance with step (c).

For the purposes of the present invention, the term "bearing surface" should be understood as meaning either a belt conveyor coated with a nonstick layer, or a nonstick protective film ("release liner"), or a support layer.

In the case where the bearing surface is a nonstick protective film, the process for manufacturing the self-adhesive article according to the invention may comprise step (d) of transferring the crosslinked adhesive layer onto a support layer.

In the case where the bearing surface is a support layer or a nonstick protective film, the process for manufacturing the self-adhesive article according to the invention may also comprise step (d) of laminating the adhesive layer onto a nonstick protective film.

According to a preferred variant of the invention, step (d) of the process described above consists in transferring the crosslinked adhesive layer onto a flexible support layer (which may be a plastic film) after cooling of the crosslinked adhesive layer to a temperature below the degradation temperature or softening point of the material of which the support layer is composed.

According to one embodiment, the process for manufacturing the self-adhesive article according to the invention also comprises a step (e) of coating a second layer of adhesive composition according to the invention onto the support layer followed by a step (f) of crosslinking the adhesive composition coated in step (e) by heating to a temperature ranging from 20 to 200° C. According to this embodiment, a double-sided self-adhesive article is obtained.

The coating step (b) may be performed by means of known coating devices, for instance a lip nozzle or a nozzle of curtain type, or else with a roller. It uses a weight per unit area of adhesive composition ranging from 10 g/m$^2$ to 5000 g/m$^2$.

The weight per unit area of adhesive composition required for the manufacture of self-adhesive labels may range from 10 to 100 g/m$^2$, preferably from 20 to 50 g/m$^2$. The weight per unit area required for the manufacture of self-adhesive tapes may vary within a much wider range extending from 3 to 5000 g/m$^2$, preferably from 15 to 250 g/m$^2$ per face.

According to one embodiment, the coated adhesive composition is also subjected, during step (c), to a treatment under a humid atmosphere characterized by its moisture level and, in particular, in a gaseous environment in which water molecules are present at between 10 and 200 g per m$^3$ of gas.

Preferably, the humid atmosphere is an atmosphere in which from 2% to 100% of the molecules are water molecules, preferably from 3% to 50%, more preferably from 3% to 10%, of the molecules are water molecules.

The moisture level is expressed as the percentage of water per unit volume, which corresponds to the number of water molecules divided by the total number of molecules in a unit of volume. By virtue of the linear nature of this scale, the moisture level is readily measured and monitored by using, for example, monitors of P.I.D (Proportional-Integral-Derivative) type. The weight percentage may be calculated by multiplying the percentage of the number of water molecules relative to the total number of molecules by a factor of 0.622. General information regarding the moisture level in various environments is described by W. Wagner et al. in *International Steam Tables—Properties of Water and Steam based on the Industrial Formulation* IAPWS-IF97.

The thermal crosslinking step has the effect notably of creating—between the hydrolyzable polymer chains bearing alkoxysilane end groups of the adhesive composition and under the action of atmospheric moisture—bonds of siloxane type which lead to the formation of a three-dimensional polymer network. The adhesive composition thus crosslinked is in particular a pressure-sensitive adhesive which gives the support layer which is coated therewith the desirable adhesive power and tack.

Preferably, the coating is performed uniformly over the support layer or over the nonstick protective layer, but the coating may also be adapted to the desired shape of the final self-adhesive article.

According to one embodiment, coating with the adhesive composition is performed over at least a portion of the two faces of the support layer. If the two faces of the support layer are coated, the adhesive composition may be identical or different on the two faces and the weight per unit area may be identical or different on the two faces.

According to one embodiment of the invention, the self-adhesive article comprises an adhesive layer on at least a portion of one face or on at least a portion of the two faces of the support layer, said adhesive layer(s) being optionally coated with a nonstick protective layer.

According to one embodiment, the self-adhesive article comprises two nonstick protective layers on each of the two adhesive layers. In this case, the two protective layers can be made of identical or different materials and/or they may have an identical or different thickness.

According to a preferred variant of the process for manufacturing the self-adhesive article according to the invention, using the multicomponent adhesive composition as defined previously, step (b) of application by coating onto the bearing surface, for example onto the support layer (96), is performed by means of a facility for hot application (20) of said adhesive composition, the facility comprising:

a nozzle (50) for applying the multicomponent adhesive composition;

a line (88a) for feeding composition U included in the multicomponent adhesive composition to be applied in fluid form;

a line (66a) for feeding composition V included in the multicomponent adhesive composition to be applied in fluid form;

a line (88) for feeding the nozzle (50) with the multicomponent adhesive composition to be applied in fluid form; and a mixer (30) for mixing at least compositions U and V of the multicomponent adhesive composition;

said step (b) comprising:

supplying the feed line (88a) with at least composition U;

supplying the feed line (66a) with at least composition V;

mixing at least composition U and composition V of the multicomponent composition using a mixer (30); and hot application of the mixed multicomponent adhesive composition (80) onto a support layer with the aid of the application nozzle (50).

The mixer may be a static mixer or a dynamic mixer.

Preferably, the static or dynamic mixer must be able to be temperature-regulated. Preferably, the mixer (30) is a dynamic mixer, advantageously allowing mixing at high shear, and the obtention of better homogeneity of the adhesive composition resulting from the mixing of at least compositions U and V of the multicomponent composition.

The mixer (30) may be arranged between the lines for feeding at least composition U (88a) and composition V (66a), and the feed line (88), and may allow homogeneous mixing of the compositions constituting the multicomponent, notably two-component, adhesive composition.

The process according to the invention comprises the mixing of at least composition U and composition V of the multicomponent composition using a mixer (30). The mixing step may be a mixing of composition U with composition V, and optionally with one or more additional compositions of the multicomponent composition.

The facility may comprise heating means (44) suitable for being placed in a storage reservoir (82) comprising composition U or composition V or another additional composition of the multicomponent composition, to raise said composition to a pumping temperature; preferably, at least composition U is raised to a pumping temperature of between 50° C. and 140° C., preferably between 80° C. and 120° C., more preferentially between 90° C. and 110° C.

Preferably, the multicomponent adhesive composition is applied (after mixing at least compositions U and V) at a temperature of between 50° C. and 140° C., preferably between 80° C. and 120° C., more preferentially between 90° C. and 110° C.

FIG. 1 shows a schematic representation of one embodiment of a facility 20 suitable for performing the process for manufacturing the self-adhesive article according to the invention.

According to one embodiment, as a result of the at least double supply, composition V (66) is separated from composition U (68) up to the mixer (30) placed between the lines for feeding at least compositions U (88a) and V (66a), on the one hand, and the line (88) for feeding the multicomponent adhesive composition to be applied, on the other hand. In other words, the mixer (30) is in-line and allows a step of homogeneous mixing of compositions (66) and (68) supplied separately to be performed. The injection of composition V (66) into composition U (68) is performed in the mixer (30), as illustrated, for example, in FIG. 1, to allow immediate mixing of these compositions.

The various compositions constituting the multicomponent adhesive composition according to the invention may be totally separated, i.e. each composition is supplied separately to the hot application facility (20). In particular, the injection of composition A (68), of composition B (66) and of optional additional composition(s) of the multicomponent adhesive composition is performed in the mixer (30).

In the facility according to the invention, composition U (68) may be heated in the storage reservoir (82) by means of a heating means (44), without bringing about crosslinking of composition U (68) due to the separation of composition V (66), comprising at least the crosslinking catalyst. Heating in the storage reservoir (82), represented in the form of a drum, in particular makes it possible to reduce the viscosity of composition U (68), to facilitate the pumping in the facility (20), such as with the aid of a pump (46), before any contact with the separate composition V (66).

This heating means (44) (preferably being a hotplate) notably contributes toward raising composition U (68) to the application temperature. The application temperature notably corresponds to a temperature at which the adhesive composition to be applied has a viscosity that is low enough to allow the application, in other words the coating, of the mixed multicomponent adhesive composition (80) onto the surface (96).

Specifically, after mixing compositions V (66) and U (68), the multicomponent adhesive composition (80) is constituted and can be applied hot to the support (96) with the aid of an application nozzle (50). A temperature for application of the multicomponent adhesive composition (80) may thus correspond to a temperature at which the viscosity of the multicomponent adhesive composition is less than or equal to 50 Pa·s, preferably less than or equal to 10 Pa·s. By way of example, the multicomponent adhesive composition (80) may have a viscosity of 5±1 Pa·s at an application temperature ranging from 60° C. to 120° C. Following the application of the multicomponent adhesive composition (80) to the surface (96), the coated support (98) is subjected to a controlled temperature, and optionally to a controlled moisture level, to allow the crosslinking of the multicomponent adhesive composition.

The controlled temperature may be obtained with the aid of an oven or a chamber. The controlled temperature corresponds to a temperature of crosslinking of the multicomponent adhesive composition (80) and is, for example, between 50° C. and 200° C., preferably between 80° C. and 160° C., in particular between 100° C. and 150° C.

Similarly, composition V (66) may itself also be heated before it is mixed with composition U (68) without any risk of crosslinking before they are mixed. This is likewise the case for any composition of the multicomponent composition according to the invention.

The heating of all of the separate compositions V (66) and U (68) before mixing them notably makes it possible to bring these components to the application temperature without any risk of crosslinking before they are mixed in the mixer (30).

The self-adhesive article according to the invention may finally be used in a bonding method which is also the subject of the invention, characterized in that it comprises the following steps:

a) removing the nonstick protective layer, when such a layer is present;

b) applying the self-adhesive article to one surface of a product; and
c) applying a pressure to said article.

In step b), the self-adhesive article is applied so that the self-adhesive part of the article (formed by the self-adhesive layer) is facing the surface of the product.

According to an embodiment in which the self-adhesive article is a double-sided article, the bonding method also comprises a step in which either a second surface of a product is applied to the article bonded to the first surface of a product, or the article bonded to the first surface of a product is applied to a second surface of a product.

The examples that follow are given purely by way of illustration of the invention and should not be interpreted in order to limit the scope thereof.

EXAMPLE A (REFERENCE): HEAT-CROSSLINKABLE ADHESIVE COMPOSITION BASED ON GENIOSIL© STP-E30 WITHOUT SILSESQUIOXANE

A1. Preparation of the Composition:

The composition given in table 1 is prepared by first of all introducing the tackifying resin Dertophene® H150 into a glass reactor under vacuum and heated to approximately 160° C. Then, once the resin has fully melted, the Geniosil® STP-E30 is added.

The mixture is stirred under vacuum for 15 minutes and then cooled to 70° C. The catalyst (K-KAT® 5218) is then introduced. The mixture is kept under vacuum and with stirring for a further 10 minutes.

A2. Preparation of a PET Support Layer Coated with the Crosslinked Composition, at a Weight Per Unit Area Equal to 60 g/m$^2$:

A rectangular sheet of polyethylene terephthalate (PET) with a thickness of 50 μm and dimensions of 20 cm by 40 cm is used as support layer.

The composition obtained in point A1 is preheated to a temperature close to 100° C. and is introduced into a cartridge, from where a bead is extruded which is deposited close to the edge of the sheet parallel to its width.

The composition included in this bead is then spread over the whole of the surface of the sheet, so as to obtain a uniform layer of substantially constant thickness. A film spreader (also known as a film applicator) is used to do this, and is moved from the edge of the sheet to the opposite edge. A layer of composition corresponding to a weight per unit area of 60 g/m$^2$ is thus deposited, which represents approximately a thickness of the order of 60 μm.

The PET sheet thus coated is then placed in an oven at 120° C. and under a humid atmosphere (4% relative humidity) for 5 minutes for crosslinking of the composition, and is then laminated onto a protective nonstick layer consisting of a rectangular silicone-treated film sheet of the same dimensions.

The triple layer obtained is subjected to the two tests described below.
180° Peel Test on a Stainless-Steel Plate:

The adhesive power is evaluated by the 180° peel test on a stainless-steel plate, as described in the FINAT method No. 1, published in the FINAT Technical Handbook, 6$^{th}$ edition, 2001. FINAT is the International Federation of Self-Adhesive Label Manufacturers and Converters. The principle of this test is as follows:

A test specimen in the form of a rectangular strip (25 mm×175 mm) is cut out from the triple layer obtained previously.

This specimen, after it has been prepared, is stored for 7 days at a temperature of 70° C. and under an atmosphere with a humidity of 50%. It is then attached over two-thirds of its length (after removal of the corresponding portion of protective nonstick layer) to a substrate consisting of a stainless-steel plate. The assembly obtained is left at ambient temperature for 20 minutes. It is then placed in a tensile testing device capable, starting from the end of the rectangular strip which has remained free, of performing the peeling or detachment of the strip at an angle of 180° and with a separation speed of 300 mm per minute. The device measures the force required to detach the strip under these conditions.

The corresponding result is expressed in N/cm and indicated in table 1.
Tack Test (Also Known as the Loop Test):

The initial grab (or tack) is evaluated by the "loop" tack test described in the FINAT method No. 9, the principle of which is as follows:

A test specimen in the form of a rectangular strip (25 mm×175 mm) is cut out from the triple layer obtained previously. This specimen, after it has been prepared, is stored for 7 days at a temperature of 70° C. and under an atmosphere with a humidity of 50%. After removing all of the protective nonstick layer, the two ends of this strip are joined so as to form a loop, the adhesive layer of which is facing outward. The two joined ends are placed in the movable jaw of a tensile testing device capable of imposing a displacement speed of 300 mm/minute along a vertical axis with to-and-fro possibility. The lower part of the loop placed in the vertical position is first brought into contact with a horizontal sheet of glass of 25 mm by 30 mm over a square region with a side length of approximately 25 mm. Once this contact has been established, the direction of displacement of the jaw is reversed. The tack is the maximum value of the force required for the loop to become completely detached from the sheet.

The corresponding result is expressed in N/cm$^2$ and is indicated in table 1.
A3. Preparation of a PET Support Layer with a Nonstick Surface Treatment and Coated with the Crosslinked Composition, at a Weight Per Unit Area Equal to 500 g/m$^2$:

A PET support layer coated with the crosslinked composition obtained in point A1 is prepared by repeating the protocol of point A2, with:
a PET support layer which has received beforehand a nonstick surface treatment,
a weight per unit area for the layer of composition (deposited on the nonstick side of the support) equal to 500 g/m$^2$, which represents an approximate thicknesses of the order of 500 μm for said layer; and
a crosslinking time in the oven of 30 minutes.

The triple layer obtained is subjected to the test described below.
Measurement of the Tensile Strength and the Elongation at Break by Tensile Testing:

The principle of the measurement consists in drawing, in a tensile testing device, the movable jaw of which is displaced at a constant speed equal to 300 mm/minute, a test specimen consisting of the crosslinked adhesive composition, and in recording, at the moment when the test specimen breaks, the applied force (in N) and also the elongation of the test specimen (in %).

The test specimen is 9 cm long and 2.5 cm wide for a thickness of 500 μm and is obtained by cutting out, after having removed the PET support layer and the protective nonstick layer from the triple layer obtained above.

The results of the measurements obtained are given in table 1.

EXAMPLES 1 AND 2 (ACCORDING TO THE INVENTION): HEAT-CROSSLINKABLE ADHESIVE COMPOSITION BASED ON GENIOSIL® STP-E30 WITH 5% AND 10% BY WEIGHT OF SILSESQUIOXANE

Example A is repeated with the compositions given in table 1.

These compositions are prepared in accordance with protocol A1, except that the Dow Corning® 3074 is introduced at the same time as the catalyst.

The results of the peel, tack and tensile tests are also indicated in table 1. As regards the tensile test, breaking of the test specimen is not observed under the test conditions.

A significant increase in the peel and the tack, and also in the elongation at break and the tensile strength relative to the reference example A, are observed.

EXAMPLE B (REFERENCE): HEAT-CROSSLINKABLE ADHESIVE COMPOSITION BASED ON GENIOSIL® STP-E30 WITHOUT SILSESQUIOXANE

The composition given in table 2 is prepared as indicated in point A1 of example A, replacing the tackifying resin Dertophene® H150 with the tackifying resin Picco® AR100.

The protocol indicated in point A2 is repeated with the composition thus obtained, so as to prepare a PET support layer coated with the crosslinked composition at a weight per unit area equal to 60 g/m².

The triple layer obtained is then subjected to the three tests described below.
- the 180° peel test on a stainless-steel plate, performed in accordance with example A, except that, after it has been prepared, the test specimen is stored for one day at 23° C.;
- the 180° peel test on a high-density polyethylene (or HDPE) plate, performed in accordance with example A, except that, after it has been prepared, the test specimen is stored for one day at 23° C. and the stainless-steel plate used as substrate is replaced with an HDPE plate;
- the 180° peel test on a polypropylene (or PP) plate, performed in accordance with example A, except that, after it has been prepared, the test specimen is stored for one day at 23° C. and the stainless-steel plate used as substrate is replaced with a PP plate.

The results obtained are collated in table 2.

EXAMPLE 3 (ACCORDING TO THE INVENTION): HEAT-CROSSLINKABLE ADHESIVE COMPOSITION BASED ON GENIOSIL® STP-E30 WITH 5% BY WEIGHT OF SILSESQUIOXANE

Example B is repeated with the composition given in table 2.

This composition is prepared in accordance with protocol A1, except that the Dow Corning® 3074 is introduced at the same time as the catalyst.

The results of the peel tests are also indicated in table 2. Relative to the reference example B, a significant increase in the peel force is observed on the three substrates tested.

TABLE 1

| | Ingredient | Example A | Example 1 | Example 2 |
|---|---|---|---|---|
| | | Content in weight/weight % | | |
| (A) | Geniosil® STP-E30 | 52 | 49.4 | 46.7 |
| (B) | Dertophene® H150 | 47 | 44.6 | 42.3 |
| (C) | Dow Corning® 3074 | — | 5 | 10 |
| (D) | K-KAT® 5218 | 1 | 1 | 1 |
| | 180° C. peel (N/cm) | 8.0 | 11.8 | 14.1 |
| | Tack (N/cm²) | 5.9 | 9.5 | 9.9 |
| | Tensile strength (N) | 16 | no breaking | no breaking |
| | Elongation at break (%) | 823 | >1000 | >1000 |

TABLE 2

| | Ingredient | Example B | Example 3 |
|---|---|---|---|
| | | Content in weight/weight % | |
| (A) | Geniosil® STP-E30 | 47 | 42.4 |
| (B) | Picco® AR100 | 52 | 51.6 |
| (C) | Dow Corning® 3074 | — | 5 |
| (D) | K-KAT® 5218 | 1 | 1 |
| | 180° peel on a stainless-steel plate (N/cm) | 10.5 | 13.2 |
| | 180° peel on an HDPE plate (N/cm) | 3.7 | 5.4 |
| | 180° C. peel on a PP plate (N/cm) | 9.5 | 11.5 |

The invention claimed is:

1. A heat-crosslinkable adhesive composition comprising:
   at least one polymer (A) comprising a hydrolyzable alkoxysilane group;
   at least one tackifying resin (B);
   from 2% to 30% by weight of at least one silsesquioxane resin (C) on the total weight of the adhesive composition; and
   at least one crosslinking catalyst (D),
   wherein the silsesquioxane resin (C) corresponds to the general formula (V):

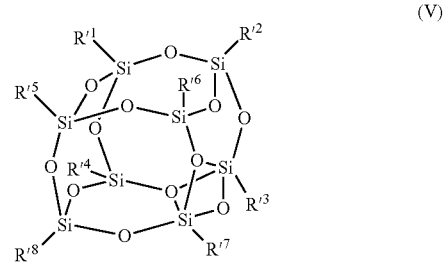

(V)

wherein each one from among $R'^1$ to $R'^8$ represents, independently of each other, a group chosen from:
a hydrogen atom,
a radical chosen from the group consisting of a linear or branched C1-C4 alkoxy radical, a linear or branched alkyl radical comprising from 1 to 30 carbon atoms, an alkenyl radical comprising from 2 to 30 carbon atoms, an aromatic radical comprising from 6 to 30 carbon atoms, an allyl radical comprising from 3 to 30 carbon atoms, a cyclic aliphatic radical comprising from 3 to 30 carbon atoms and an acyl radical comprising from 1 to 30 carbon atoms, and
a group —OSiR'^9R'^{10} wherein $R'^9$ and $R'^{10}$ each represents, independently of each other, a hydrogen atom or a radical chosen from the group consisting of linear or branched C1-C4 alkyls, linear or branched C1-C4 alkoxys, C2-C4 alkenyls, a phenyl, a C3-C6 allyl radical, a cyclic C3-C8 aliphatic radical and a C1-C4 acyl radical;

on condition:
that at least one radical from among the radicals $R'^1$ to $R'^8$ is a C1-C4 alkoxy radical; and
that at least one radical from among the radicals $R'^1$ to $R'^8$ is a phenyl radical.

2. The adhesive composition as claimed in claim 1, wherein the polymer (A) comprises at least one hydrolyzable group of formula (I):

$$—Si(R^4)_p(OR^5)_{3-p} \qquad (I)$$

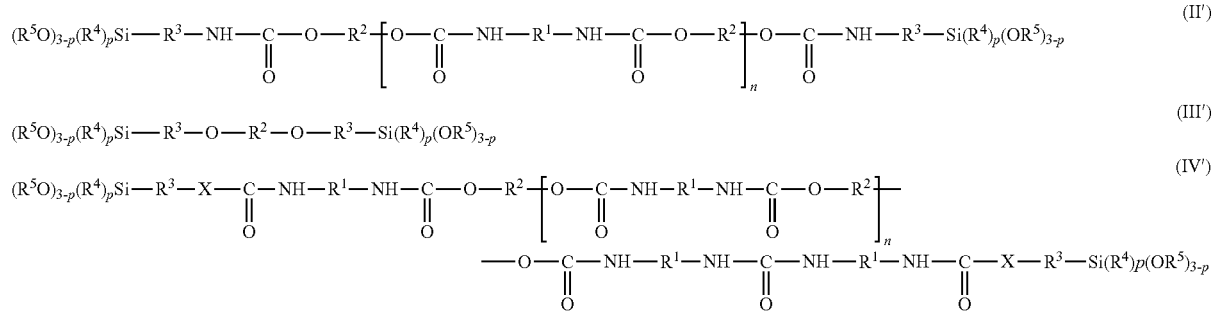

wherein:
$R^4$ represents a linear or branched alkyl radical comprising from 1 to 4 carbon atoms, with the possibility that when there are several radicals $R^4$, these radicals are identical or different;
$R^5$ represents a linear or branched alkyl radical comprising from 1 to 4 carbon atoms, with the possibility that when there are several radicals $R^5$, these radicals are identical or different, with the possibility that two groups $OR^5$ may be engaged in the same ring;
p is an integer equal to 0, 1 or 2.

3. The adhesive composition as claimed in claim 2, wherein the polymer (A) corresponds to One of the formulae (II), (III) or (IV):

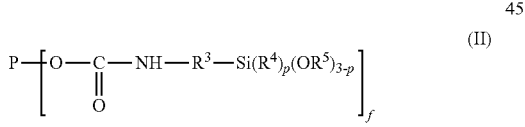

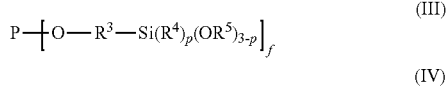

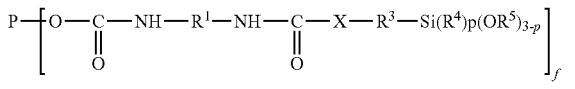

wherein:
P represents a saturated or unsaturated, linear or branched polymeric radical optionally comprising one or more heteroatoms, and having a number-average molar mass ranging from 100 g/mol to 48,600 g/mol,
$R^1$ represents a divalent hydrocarbon-based radical comprising from 5 to 15 carbon atoms, which may be aromatic or aliphatic, linear, branched or cyclic, $R^3$ represents a linear or branched divalent alkylene radical comprising from 1 to 6 carbon atoms, X represents a divalent radical chosen from —NH—, —NR$^7$— or —S—, $R^7$ represents a linear or branched alkyl radical comprising from 1 to 20 carbon atoms and which may also comprise one or more heteroatoms, and f is an integer ranging from 1 to 6.

4. The adhesive composition as claimed in claim 3, wherein the polymer (A) corresponds to one of the formulae (II'), (III') or (IV'):

wherein:
$R^2$ represents a saturated or unsaturated, linear or branched divalent hydrocarbon-based radical optionally comprising one or more heteroatoms, and having a number-average molar mass ranging from 100 g/mol to 48,600 g/mol, and
n is an integer greater than or equal to 0.

5. The adhesive composition as claimed in claim 4, wherein the polymer (A) is a silyl polymer of formula (III') wherein $R^2$ is a divalent radical derived from a polyether.

6. The adhesive composition as claimed in claim 1, wherein the resin (B) is chosen from:
  i. resins obtained by polymerization of terpene hydrocarbons and of phenols, in the presence of Friedel-Crafts catalysts;
  ii. resins obtained by a process comprising the polymerization of α-methylstyrene, it also being possible for said process to comprise a reaction with phenols;
  iii. rosins of natural origin or modified rosins;
  iv. resins obtained by hydrogenation, polymerization or copolymerization (with an aromatic hydrocarbon) of mixtures of unsaturated aliphatic hydrocarbons containing approximately 5, 9 or 10 carbon atoms obtained from petroleum fractions;
  v. terpene resins;
  vi. copolymers based on natural terpenes; or
  vii. acrylic resins having a viscosity at 100° C. of less than 100 Pa·s.

7. The adhesive composition as claimed in claim 1, wherein it is in the form of a one-component composition comprising:
  from 3% to 90% by weight of the polymer (A);
  from 15% to 80% by weight of the tackifying resin (B);
  from 2% to 30% by weight of the silsesquioxane resin (C); and
  from 0.01% to 10% by weight of the crosslinking catalyst (D);

wherein the weight percentages are indicated on the basis of the total weight of one-component composition.

8. The adhesive composition as claimed in claim 1, wherein it is in the form of a multicomponent composition comprising:
- a composition U comprising:
  - the polymer (A); and
  - the tackifying resin (B); and
- a composition V comprising:
  - the crosslinking catalyst (D); and
  - at least one compound (E) chosen from:
    - a compound (E1) with a number-average molecular mass ranging from 300 g/mol to 100,000 g/mol; and
    - a compound (E2) with a vapor pressure at 20° C. of greater than or equal to 0.08 kPa;
- the silsesquioxane resin (C) being included in composition U or in composition V.

9. The heat-crosslinkable adhesive composition of claim 1, comprising:
- at least one polymer (A) comprising a hydrolyzable alkoxysilane group;
- at least one tackifying resin (B);
- from 2% to 15% by weight of at least one silsesquioxane resin (C); and
- at least one crosslinking catalyst (D).

10. The heat-crosslinkable adhesive composition of claim 9, comprising:
- at least one polymer (A) comprising a hydrolyzable alkoxysilane group;
- at least one tackifying resin (B);
- from 3% to 12% by weight of at least one silsesquioxane resin (C); and
- at least one crosslinking catalyst (D).

* * * * *